United States Patent
Zhang et al.

(10) Patent No.: US 8,824,307 B2
(45) Date of Patent: Sep. 2, 2014

(54) COMMUNICATING BETWEEN USER EQUIPMENT (UE) AND INDEPENDENT SERVING SECTORS IN A WIRELESS COMMUNICATIONS SYSTEM

(75) Inventors: Danlu Zhang, San Diego, CA (US); Sharad Deepak Sambhwani, San Diego, CA (US); Jilei Hou, Beijing (CN); Pavan Kumar Vitthaladevuni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 265 days.

(21) Appl. No.: 13/269,721

(22) Filed: Oct. 10, 2011

(65) Prior Publication Data
US 2012/0163185 A1   Jun. 28, 2012

Related U.S. Application Data

(60) Provisional application No. 61/392,915, filed on Oct. 13, 2010.

(51) Int. Cl.
| H04W 4/00 | (2009.01) |
| H04W 72/08 | (2009.01) |
| H04W 72/04 | (2009.01) |

(52) U.S. Cl.
CPC ........ H04W 72/085 (2013.01); *H04W 72/0413* (2013.01)
USPC ....................................................... 370/241

(58) Field of Classification Search
None
See application file for complete search history.

(56) References Cited

U.S. PATENT DOCUMENTS

| 6,456,847 | B1 | 9/2002 | Lilja et al. |
| 7,961,700 | B2 | 6/2011 | Malladi et al. |
| 2006/0251026 | A1 | 11/2006 | Kalhan |
| 2006/0274712 | A1 | 12/2006 | Malladi et al. |
| 2009/0116468 | A1* | 5/2009 | Zhang et al. .................. 370/342 |
| 2009/0245212 | A1* | 10/2009 | Sambhwani et al. ......... 370/336 |
| 2009/0262654 | A1 | 10/2009 | Iwamura et al. |
| 2009/0296643 | A1 | 12/2009 | Cave et al. |
| 2009/0300456 | A1 | 12/2009 | Pelletier et al. |
| 2010/0238829 | A1 | 9/2010 | Sambhwani et al. |
| 2010/0296446 | A1 | 11/2010 | Zhang et al. |

FOREIGN PATENT DOCUMENTS

| JP | 2000184428 A | 6/2000 |
| JP | 2008541620 A | 11/2008 |
| JP | 2011182458 A | 9/2011 |
| KR | 20090097953 A | 9/2009 |
| WO | 2006116102 A2 | 11/2006 |
| WO | 2006121900 A2 | 11/2006 |

OTHER PUBLICATIONS

Danlu Zhang et al., "Performance Analysis of Dual-Carrier HSDPA", Members IEEE 2010, 5 pages.

(Continued)

*Primary Examiner* — John Blanton
(74) *Attorney, Agent, or Firm* — Darren M. Simon

(57) ABSTRACT

A wireless communication system transmits in a High Speed Downlink Packet Access (HSDPA) by having a Radio Network Controller (RNC) assign portions of data to a first serving cell and a second serving cell for transmitting to a user equipment. The first serving cell transmits data on a first downlink carrier to the user equipment. The second serving cell, which is independent from the first serving cell, transmits data on a second downlink carrier to the user equipment. In an optional aspect, the RNC receives a measurement report from the user equipment on a first uplink carrier via at least one of the first serving cell and the second serving cell.

7 Claims, 13 Drawing Sheets

(56) References Cited

OTHER PUBLICATIONS

Huawei et al: "Considerations on HSDPA multi-point transmission", 3GPP Draft ; R1-110322 Considerations on HSDPA Multi-Point Transmission, 3rd Generation Partnership Project (3GPP), Mobile Competence Centre ; 650, Route Deslucioles : F-06921 Sophia-Antipolis Cedex; France, vol. RAN WG1, No. Dublin, Ireland;20110117, Jan. 13, 2011, XP050490381.

Huawei et al: "RAN2 Impacts of Inter-NodeB HSPDA Multipoint Transmission", 3GPP Draft; R2-112936 RAN2 Impacts of Inter-NodeB Multipoint HSDPA Transmission, 3rd Generation Partnership Project (3GPP),Mobile Competence Centre ; 650, Route Deslucioles ; F-06921 Sophia-Antipolis Cedex; France, vol. RAN WG2, No. Barcelona, Spain:20110509, May 1, 2011,XP050494957.

International Search Report and Written Opinion—PCT/US2011/057737—ISAEPO—Mar. 16, 2012.

Nokia Siemens Networks et al: "Multi-cell transmission techniques for HSDPA", 3GPP Draft; R1-104913, 3rd Generation Partnership Project (3GPP), Mobile Competence Centre; R1-104913, 3rd Generation Partnership Project (3GPP), Mobile Competence Centre ; 650, Route Des Lucioles ; F-06921 Sophia-Antipolis Cedex ; France, vol. RAN WG1, No. Madrid, Spain; 20100823, Aug. 17, 2010, XP050450059, [retrieved on Aug. 17, 2010] paragraphs [003.], [03.5], [04.1].

Philips: "Reduction of HS-DPCCH power requirements" 36PP Draft; RI-02-1085, 3rd Generation Partnership Project (3GPP), Mobile Competence Centre ; 650, Route Des Lucioles ; F-06921 Sophia-Antipolis Cedex : France, No. Seattle, USA; 20020819, Aug. 15, 2002, XP050096724 section 2, lines 1-2.

Qualcomm Incorporated: "DL Scheduling, RLC and Flow Control assumption for Inter-NodeB Multi-Point Transmissions", 3GPP Draft; R1-110126_DL_SCH_RLC_Flow_Control_ASS_Inter-NodeB_MP-HSDPA, 3rd Generation Partnership Project (3GPP), Mobile Competence Centre ; 650, Route Des Lucioles ; F-06921 Sophia-Antipolis Cedex ; France, vol. RAN WG1, No. Dublin, Ireland; 20110117, Jan. 11, 2011, XP050474375.

* cited by examiner

COMMUNICATING BETWEEN USER EQUIPMENT (UE) AND INDEPENDENT SERVING SECTORS IN A WIRELESS COMMUNICATIONS SYSTEM

CLAIM OF PRIORITY UNDER 35 U.S.C. §119

The present application for patent claims priority to Provisional Application No. 61/392,915 entitled "COMMUNICATING BETWEEN A USER EQUIPMENT (UE) AND A PLURALITY OF INDEPENDENT SERVING SECTORS IN A WIRELESS COMMUNICATIONS SYSTEM" filed Oct. 13, 2010, and assigned to the assignee hereof and hereby expressly incorporated by reference herein.

BACKGROUND

The present application pertains to communicating between user equipment (UE) and a plurality of independent serving sectors in a wireless communications system.

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

In the design of such communications systems, it is desirable to maximize the capacity, or the number of users the system can reliably support, given the available resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, the present disclosure provides a method of receiving data in High Speed Downlink Packet Access (HSDPA) from two independent cells or sectors. A user equipment (UE) receives data on a first downlink carrier from a first serving cell. The UE receives data on a second downlink carrier from a second serving cell that is independent from the first serving cell. In an exemplary aspect, the UE transmits channel feedback on a first uplink carrier to at least one of the first serving cell and the second serving cell.

In another aspect, the present disclosure provides at least one processor for receiving data in HSDPA from two independent cells or sectors. A first module receives data on a first downlink carrier from a first serving cell. A second module receives data on a second downlink carrier from a second serving cell that is independent from the first serving cell. In an exemplary aspect, a third module transmits channel feedback on a first uplink carrier to at least one of the first serving cell and the second serving cell.

In an additional aspect, the present disclosure provides a computer program product of receiving data in HSDPA from two independent cells or sectors. A non-transitory computer-readable storage medium includes stored sets of code. A first set of codes causes a computer to receive data, at a user equipment, on a first downlink carrier from a first serving cell. A second set of codes causes the computer to receive data, at the user equipment, on a second downlink carrier from a second serving cell that is independent from the first serving cell. In an exemplary aspect, a third set of codes causes the computer to transmit, by the user equipment, channel feedback on a first uplink carrier to at least one of the first serving cell and the second serving cell.

In a further aspect, the present disclosure provides an apparatus of receiving data in HSDPA from two independent cells or sectors. The apparatus comprises means for receiving data, at a user equipment, on a first downlink carrier from a first serving cell. Apparatus comprises means for receiving data, at the user equipment, on a second downlink carrier from a second serving cell that is independent from the first serving cell. In an exemplary aspect, apparatus comprises means for transmitting, by the user equipment, channel feedback on a first uplink carrier to at least one of the first serving cell and the second serving cell.

In yet another aspect, the present disclosure provides an apparatus of receiving data in HSDPA from two independent cells or sectors. A first receiver receives data, at a user equipment, on a first downlink carrier from a first serving cell. A second receiver receives data, at the user equipment, on a second downlink carrier from a second serving cell that is independent from the first serving cell. In an exemplary aspect, a first transmitter transmits, by the user equipment, channel feedback on a first uplink carrier to at least one of the first serving cell and the second serving cell.

In yet a further aspect, the present disclosure provides a method of transmitting data in HSDPA from two independent cells or sectors. A Radio Access Network (RAN) assigns, by a Radio Network Controller (RNC), portions of data to a first serving cell and a second serving cell for transmitting to a user equipment. The RAN transmits data, by the first serving cell, on a first downlink carrier to the user equipment. The RAN transmits data, by the second serving cell that is independent from the first serving cell, on a second downlink carrier to the user equipment. In an optional aspect, the RAN receives, by the RNC, channel feedback from the user equipment on a first uplink carrier via at least one of the first serving cell and the second serving cell.

In another aspect, the present disclosure provides at least one processor for transmitting data in HSDPA from two independent cells or sectors. A first module assigns, by an RNC, portions of data to a first serving cell and a second serving cell for transmitting to a user equipment. A second module transmits data, by the first serving cell, on a first downlink carrier to the user equipment. A third module transmits data, by the second serving cell that is independent from the first serving cell, on a second downlink carrier to the user equipment. In an optional aspect, a fourth module receives, from the user equipment, channel feedback on a first uplink carrier via at least one of the first serving cell and the second serving cell.

In an additional aspect, the present disclosure provides a computer program product of transmitting data in HSDPA from two independent cells or sectors. A non-transitory computer-readable storage medium includes stored sets of code. A first set of codes causes a computer to assign, by an RNC, portions of data to a first serving cell and a second serving cell for transmitting to a user equipment. A second set of codes causes the computer to transmit data, by the first serving cell, on a first downlink carrier to the user equipment. A third set of codes causes the computer to transmit data, by the second serving cell that is independent from the first serving cell, on a second downlink carrier to the user equipment. Optionally, a fourth set of codes causes the computer to receive, from the user equipment, channel feedback on a first uplink carrier via at least one of the first serving cell and the second serving cell.

In a further aspect, the present disclosure provides an apparatus of transmitting data in HSDPA from two independent cells or sectors. The apparatus comprises means for assigning, by an RNC, portions of data to a first serving cell and a second serving cell for transmitting to a user equipment. The apparatus comprises means for transmitting data, by the first serving cell, on a first downlink carrier to the user equipment. The apparatus comprises means for transmitting data, by the second serving cell that is independent from the first serving cell, on a second downlink carrier to the user equipment. In an optional aspect, the apparatus comprises means for receiving, from the user equipment, channel feedback on a first uplink carrier via at least one of the first serving cell and the second serving cell.

In yet another aspect, the present disclosure provides an apparatus of transmitting data in HSDPA from two independent cells or sectors. An RNC assigns portions of data to a first serving cell and a second serving cell for transmitting to a user equipment. The first serving cell transmits data, on a first downlink carrier to the user equipment. The second serving cell, which is independent from the first serving cell, transmits data on a second downlink carrier to the user equipment. In an optional aspect, the RNC receives channel feedback from the user equipment on a first uplink carrier via at least one of the first serving cell and the second serving cell.

To the accomplishment of the foregoing and related ends, the one or more aspects comprise the features hereinafter described in detail and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

A user equipment (UE) establishes concurrently a first serving sector and a second serving sector. The first serving sector is configured to transmit to the UE on at least one downlink carrier from a first set of carriers, and the second serving sector is configured to transmit to the UE on at least one downlink carrier of a second set of carriers. The UE is assigned one uplink carrier by which the UE can send feedback to the first and second serving sectors, the uplink carrier included among the first and second sets of carriers. The UE receives data transmissions from the first and second serving sectors on their respective downlink carriers. The UE measures pilot signals of local sectors and provides channel feedback on the uplink carrier. The access network maintains an active set for the UE based on a measurement report.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
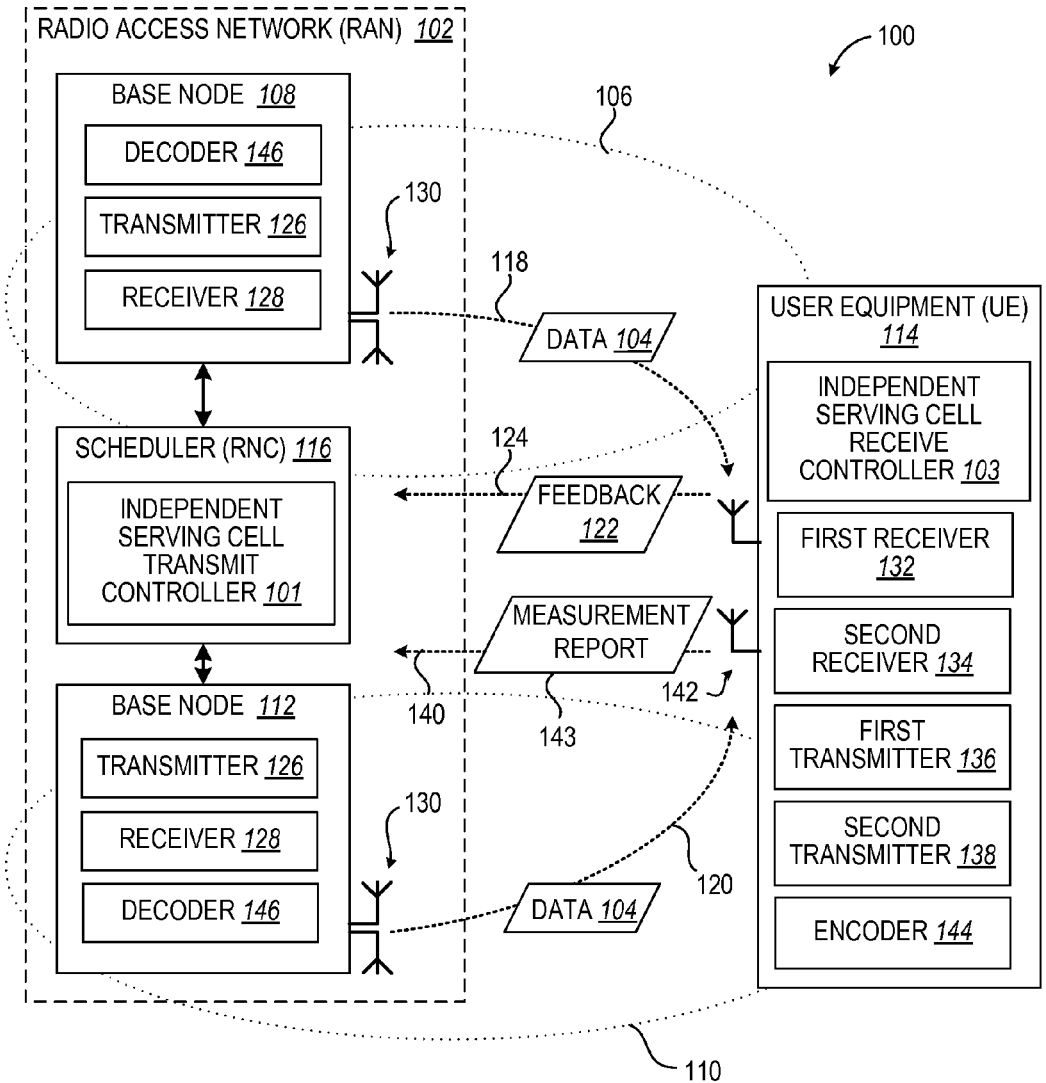
FIG. 1 is a timing diagram of one aspect of a user apparatus and a network apparatus in a wireless communication system.

With reference to FIG. 1, in a wireless communication system 100, a network apparatus, depicted as a Radio Access Network (RAN) 102, includes an independent serving cell transmit controller 101 that manages independent serving cells transmitting on multiple carriers to a user apparatus, depicted as a user equipment (UE) 114. In an aspect, RAN 102 transmits data 104 in High Speed Downlink Packet Access (HSDPA) from two independent cells, depicted as a first serving cell 106 provided by a first base node 108 and as a second serving cell 110 provided by a second base node 112, to UE 114. In an aspect, a scheduler, depicted as a Radio Network Controller (RNC) 116 of the RAN 102, executes independent serving cell transmit controller 101 and resultingly assigns portions of data 104 to the first serving cell 106 and the second serving cell 110 for transmitting to UE 114. In particular, the first serving cell 106 transmits data 104 on a first downlink carrier 118 to the UE 114. The second serving cell 110, which is independent from the first serving cell 106, transmits data 104 on a second downlink carrier 120 to the UE 114. The RNC 116 and/or independent serving cell transmit controller 101 receives channel feedback 122 from the UE 114 on a first uplink carrier 124 via at least one of the first serving cell 106 and the second serving cell 110. The first and second base nodes can each comprise a transmitter 126 and a receiver 128 that utilize at least one antenna 130 for transmitting and receiving.

Similarly, an independent serving cell receive controller 103 for managing receiving independent serving cells on multiple carriers at the UE 114 may operate, in one aspect, to enable UE 114 to receive data in HSDPA from the two independent cells or sectors. A first receiver 132 receives data 104 on the first downlink carrier 118 from the first serving cell 106. A second receiver 134 receives data 104 on the second downlink carrier 120 from the second serving cell 110 that is independent from the first serving cell 106. A first transmitter 136 transmits the channel feedback 122 on the first uplink carrier 124 to at least one of the first serving cell 106 and the second serving cell 110.

In an exemplary aspect, the UE 114 has a second transmitter 138 for transmitting a second uplink carrier 140, which can be an anchor carrier. The first and second receivers 132, 134 and the first and second transmitters 136, 138 utilize one or more antennas 142.

A carrier can be deemed an anchor carrier in that the anchor carrier carries a control channel for a non-anchor carrier. Alternatively or in addition, measurements of an anchor carrier can be the basis for making mobility decisions. Alternatively or in addition, a single uplink also means that a single Active Set is maintained by the UE (and the network), only on the anchor carrier.

In the current multi-carrier HSPA, in W-CDMA Rel. 8, 9 and 10, all the downlink carriers have the same serving cell. Although such an implementation simplifies certain operations on the Medium Access Control (MAC) and Radio Link Control (RLC) layers, it also limits the UE data rate in many situations. The present innovation enables a wireless communication system of more than one independent sector or cell, wherein the serving cell of each carrier can be chosen independently. Channel feedback on one or more uplink carriers from the UE is addressed. In particular, the carriers can be grouped into carrier groups. Each carrier group has one uplink carrier and therefore one active set. The serving cell for each downlink carrier is chosen from among the member cells in the active set for that carrier group. The mobility could be based on an anchor carrier, or may be independent per carrier group. The HS-DPCCH could be coded into one code word and sent over the anchor uplink carrier, or coded per carrier group and sent over the uplink carrier linked to that carrier group.

Thus, in one aspect, the first serving cell and the second serving cell can be selected, e.g. by the RNC 116 executing independent serving cell transmit controller 101, from an active set based upon a measurement report 143.

In another aspect, the first serving cell 106 transmits a first High Speed Shared Control Channel (HS-SCCH) for the first downlink carrier 118. The second serving cell 110 transmits a second HS-SCCH for the second downlink carrier 120. In an aspect, in response to operation of independent serving cell receive controller 103, an encoder 144 at the UE 114 encodes the channel feedback 122 in one code word on the first uplink carrier 124 comprising High Speed Downlink Physical Control Channel (HS-DPCCH) information based at least in part upon the first HS-SCCH and the second HS-SCCH. The one code word can be decoded by a decoder 146 at the RAN 102.

Figure 2A:
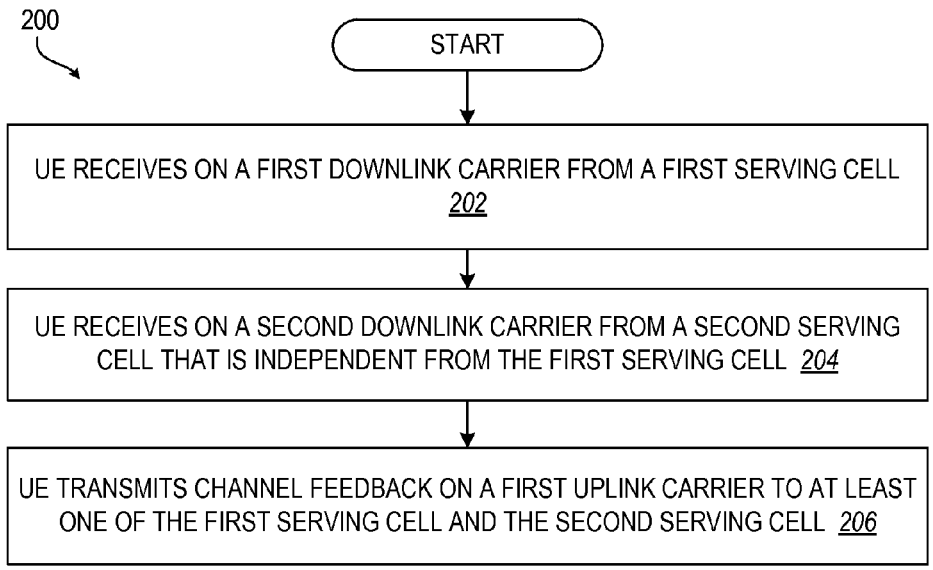
FIG. 2A is a flow diagram of one aspect of a method for communication using received data from independent serving cells performed by a user apparatus.

By virtue of the foregoing, in FIG. 2A a methodology 200, such as performed by the user equipment 114 of FIG. 1, is for receiving data in High Speed Downlink Packet Access (HSDPA) from two independent cells or sectors. The user equipment receives data on a first downlink carrier from a first serving cell (block 202). The user equipment receives data on a second downlink carrier from a second serving cell that is independent from the first serving cell (block 204). In an optional aspect, the user equipment transmits channel feedback on a first uplink carrier to at least one of the first serving cell and the second serving cell (block 206).

In an exemplary aspect, the first serving cell and the second serving cell are selected by a Radio Network Controller (RNC) from an active set based upon the measurement report.

In another exemplary aspect, the method further comprises monitoring a first High Speed Shared Control Channel (HS-SCCH) transmitted by the first serving cell for the first downlink carrier; and monitoring a second HS-SCCH transmitted by the second serving cell for the second downlink carrier. User equipment encodes in one code word on the first uplink carrier, channel feedback comprising High Speed Downlink Physical Control Channel (HS-DPCCH) information based at least in part upon the first HS-SCCH and the second HS-SCCH. In a particular aspect, the user equipment transmits data on a second uplink carrier to at least one of the first serving cell and the second serving cell, wherein the first uplink carrier comprises an anchor carrier.

In an additional exemplary aspect, the user equipment receives a first assignment of the first downlink carrier and the first uplink carrier to a first carrier group and receiving a second assignment of the second downlink carrier and a second uplink carrier to a second carrier group. The user equipment transmits channel feedback on the first uplink carrier to the first serving cell and transmits channel feedback on a second uplink carrier to the second serving cell. In a particular aspect, the user equipment determines the channel feedback for a selected carrier group by monitoring a HS-SCCH for each downlink carrier assigned to the selected carrier group. In a more specific aspect, the user equipment triggers mobility between serving cells for a selected carrier group in response to a channel quality being below a threshold of either one of the first downlink carrier and the second downlink carrier.

In a further exemplary aspect, the user equipment triggers mobility between serving cells in response to a channel quality being below a threshold of a selected one of the first downlink carrier and the second downlink carrier designated as an anchor carrier. In a particular aspect, the user equipment measures channel quality using compressed mode of a third downlink carrier transmitted by a new cell to update an active set of neighboring cells and sectors.

In yet another aspect, the user equipment triggers mobility between serving cells in response to a channel quality being below a threshold of either one of the first downlink carrier and the second downlink carrier.

In yet an additional aspect, the first serving cell can comprise a first serving sector and the second serving cell can comprise a second serving sector.

Figure 2B:
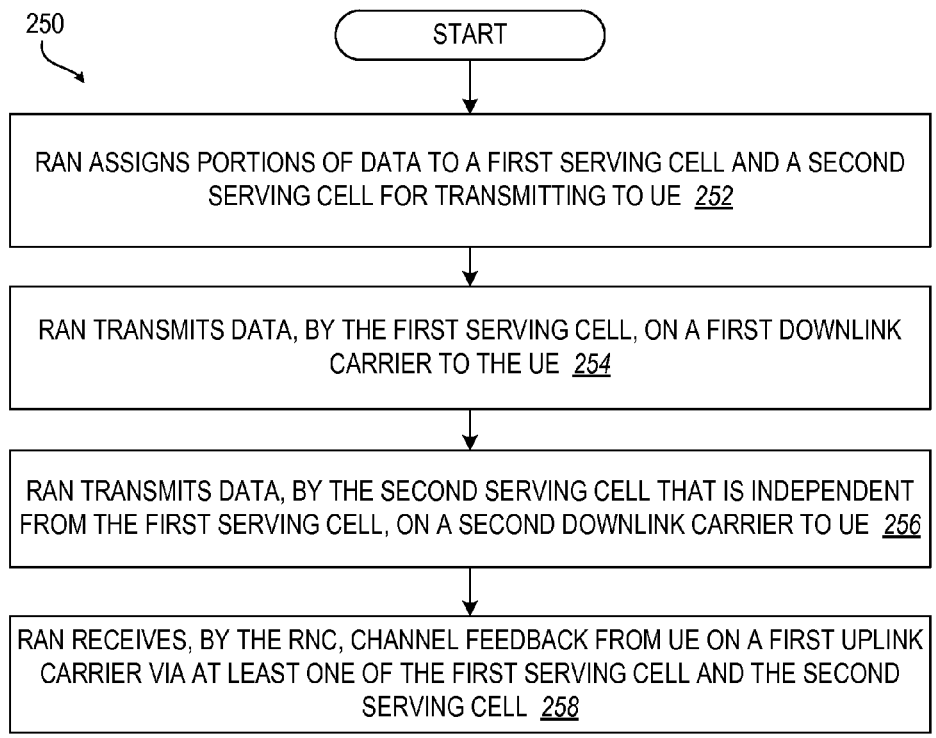
FIG. 2B is a flow diagram of one aspect of a method for communication using transmitted data from independent serving cells performed by a network apparatus.

In FIG. 2B a methodology 250, such as performed by the network apparatus, for example the RAN 102, of FIG. 1, is for transmitting data in HSDPA from two independent cells or sectors. The RAN assigns, by an RNC, portions of data to a first serving cell and a second serving cell for transmitting to user equipment (block 252). The RAN transmits data, by the first serving cell, on a first downlink carrier to the user equipment (block 254). The RAN transmits data, by the second serving cell that is independent from the first serving cell, on a second downlink carrier to the user equipment (block 256). In an exemplary aspect, the RAN receives, by the RNC, channel feedback from the user equipment on a first uplink carrier via at least one of the first serving cell and the second serving cell (block 258).

In one aspect, the first serving cell and the second serving cell are selected by the RNC from an active set based upon a measurement report, which can support legacy UEs.

In another aspect, the RAN transmits a first HS-SCCH by the first serving cell for the first downlink carrier and transmits a second HS-SCCH by the second serving cell for the second downlink carrier. The RAN decodes channel feedback received in one code word on the first uplink carrier comprising High Speed Downlink Physical Control Channel (HS-DPCCH) information based at least in part upon the first HS-SCCH and the second HS-SCCH. In an exemplary aspect, the RAN receives, by at least one of the first serving cell and the second serving cell, data on a second uplink carrier from the user equipment, wherein the first uplink carrier comprises an anchor carrier.

In an additional aspect, the RAN assigns the first downlink carrier and the first uplink carrier to a first carrier group and assigns the second downlink carrier and a second uplink carrier to a second carrier group. The RAN receives, by the first serving cell, channel feedback on the first uplink carrier from the user equipment. The RAN receives, by the second serving cell, channel feedback on the second uplink carrier from the user equipment. In an exemplary aspect, the RAN receives the channel feedback for a selected carrier group based on a HS-SCCH for each downlink carrier assigned to the selected carrier group. In a particular aspect, the RAN triggers mobility between serving cells for a selected carrier group in response to a channel quality being below a threshold of either one of the first downlink carrier and the second downlink carrier.

In a further aspect, the RAN transmits, by the first serving cell, data using the second downlink carrier to other user equipment. The RAN selects, through operation of the RNC, the first serving cell to transmit the first downlink carrier and the second serving cell to transmit the second downlink carrier to the user equipment for increased throughput.

In yet another aspect, the RAN transmits, by the first serving cell, data using the second downlink carrier. The RAN transmits, by the second serving cell, by data using the first uplink carrier to other user equipment. The RAN selects, through operation of the RNC, the first serving cell to transmit the first downlink carrier and the second serving cell to transmit the second downlink carrier to the user equipment for load balancing.

In yet an additional aspect, the RAN triggers mobility between serving cells in response to a channel quality being below a threshold of a selected one of the first downlink carrier and the second downlink carrier designated as an anchor carrier.

In yet a further aspect, the RAN triggers mobility between serving cells in response to a channel quality being below a threshold of either one of the first downlink carrier and the second downlink carrier.

In one aspect, the first serving cell comprises a first serving sector and the second serving cell comprises a second serving sector.

Figure 3:
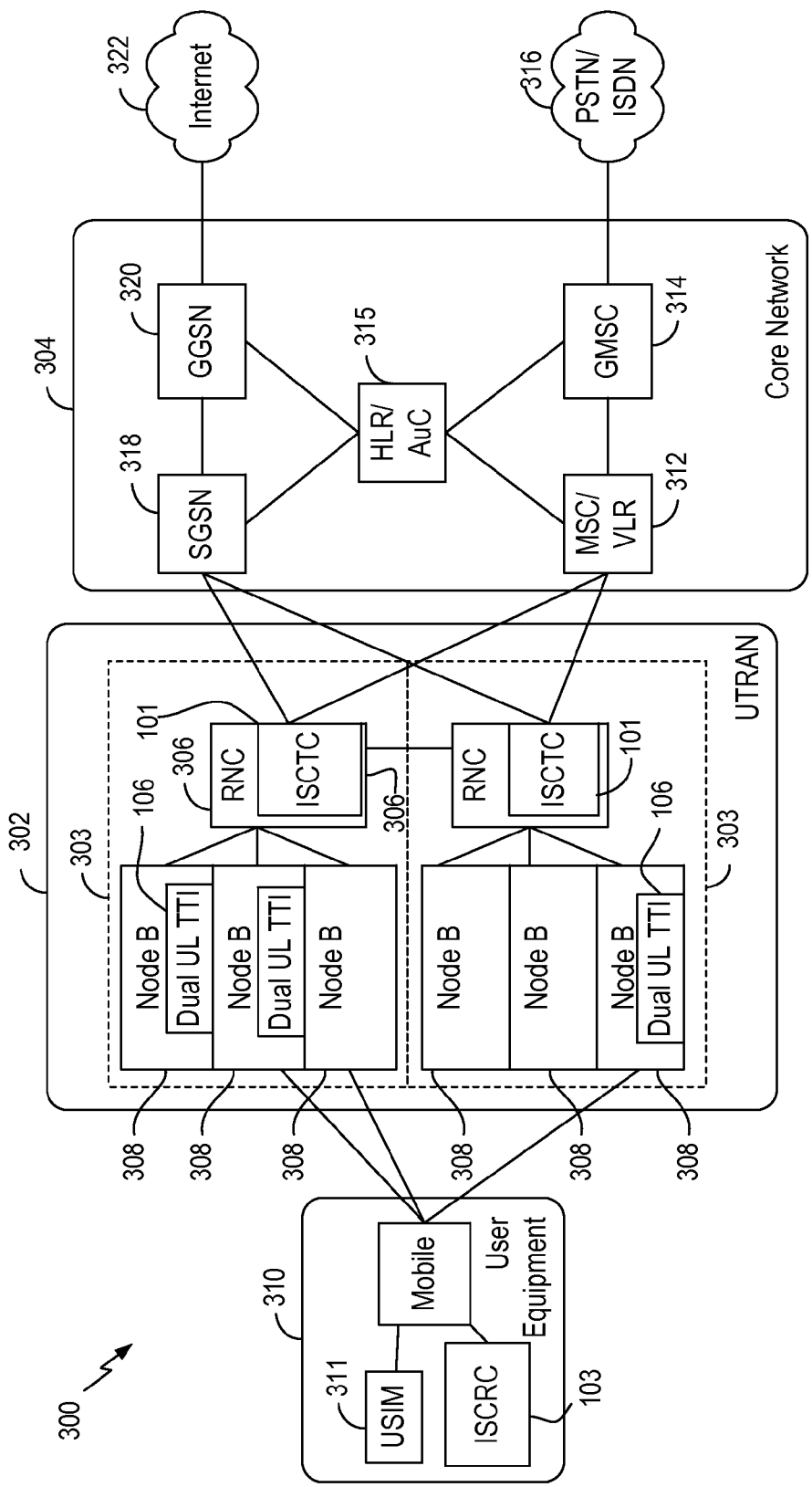
FIG. 3 is a block diagram conceptually illustrating an example of one aspect of a telecommunications system.

The various concepts presented throughout this disclosure may be implemented across a broad variety of telecommunication systems, network architectures, and communication standards. By way of example and without limitation, the aspects of the present disclosure illustrated in FIG. 3 are presented with reference to a UMTS system 300 employing a W-CDMA air interface. A UMTS network includes three interacting domains: a Core Network (CN) 304, a UMTS Terrestrial Radio Access Network (UTRAN) 302, and User Equipment (UE) 310. In this example, the UTRAN 302 provides various wireless services including telephony, video, data, messaging, broadcasts, and/or other services. The UTRAN 302 may include a plurality of Radio Network Subsystems (RNSs) such as an RNS 303, each controlled by a respective Radio Network Controller (RNC) such as an RNC 306. Serving Radio Network Subsystem (SRNS) is also used interchangeably herein for RNS. Here, the UTRAN 302 may include any number of RNCs 306 and RNSs 303 in addition to the RNCs 306 and RNSs 303 illustrated herein. The RNC 306 is an apparatus responsible for, among other things, assigning, reconfiguring and releasing radio resources within the RNS 303. The RNC 306 may be interconnected to other RNCs (not shown) in the UTRAN 302 through various types of interfaces such as a direct physical connection, a virtual network, or the like, using any suitable transport network.

Communication between a UE 310 and a NodeB 308 may be considered as including a physical (PHY) layer and a medium access control (MAC) layer. Further, communication between a UE 310 and an RNC 306 by way of a respective NodeB 308 may be considered as including a radio resource control (RRC) layer. In the instant specification, the PHY layer may be considered layer 1; the MAC layer may be considered layer 2; and the RRC layer may be considered layer 3. Information herein below utilizes terminology introduced in Radio Resource Control (RRC) Protocol Specification, 3GPP TS 25.331 v9.1.0, incorporated herein by reference.

The geographic region covered by the SRNS 303 may be divided into a number of cells, with a radio transceiver apparatus serving each cell. A radio transceiver apparatus is commonly referred to as a NodeB in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three NodeBs 308 are shown in each SRNS 303; however, the SRNSs 303 may include any number of wireless NodeBs. The NodeBs 308 provide wireless access points to a core network (CN) 304 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 310 may further include a universal subscriber identity module (USIM) 311, which contains subscription information of a user to a network. For illustrative purposes, one UE 310 is shown in communication with a number of the NodeBs 308. The downlink (DL), also called the forward link, refers to the communication link from a NodeB 308 to a UE 310, and the uplink (UL), also called the reverse link, refers to the communication link from a UE 310 to a NodeB 308.

The core network 304 interfaces with one or more access networks, such as the UTRAN 302. As shown, the core network 304 is a GSM core network. However, as those skilled in the art will recognize, the various concepts presented throughout this disclosure may be implemented in a RAN, or other suitable access network, to provide UEs with access to types of core networks other than GSM networks.

The core network 304 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). In the illustrated example, the core network 304 supports circuit-switched services with a MSC 312 and a GMSC 314. In some applications, the GMSC 314 may be referred to as a media gateway (MGW). One or more RNCs, such as the RNC 306, may be connected to the MSC 312. The MSC 312 is an apparatus that controls call setup, call routing, and UE mobility functions. The MSC 312 also includes a visitor location register (VLR) that contains subscriber-related information for the duration that a UE is in the coverage area of the MSC 312. The GMSC 314 provides a gateway through the MSC 312 for the UE to access a circuit-switched network 316. The GMSC 314 includes a home location register (HLR) 315 containing subscriber data, such as the data reflecting the details of the services to which a particular user has subscribed. The HLR is also associated with an authentication center (AuC) that contains subscriber-specific authentication data. When a call is received for a particular UE, the GMSC 314 queries the HLR 315 to determine the location of the UE and forwards the call to the particular MSC serving that location. Some network elements, like EIR, HLR, VLR and AuC may be shared by both of the circuit-switched and packet-switched domains.

The core network 304 also supports packet-data services with a serving GPRS support node (SGSN) 318 and a gateway GPRS support node (GGSN) 320. GPRS, which stands for General Packet Radio Service, is designed to provide packet-data services at speeds higher than those available with standard circuit-switched data services. The GGSN 320 provides a connection for the UTRAN 302 to a packet-based network 322. The packet-based network 322 may be the Internet, a private data network, or some other suitable packet-based network. The primary function of the GGSN 320 is to provide the UEs 310 with packet-based network connectivity. Data packets may be transferred between the GGSN 320 and the UEs 310 through the SGSN 318, which performs primarily the same functions in the packet-based domain as the MSC 312 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a NodeB 308 and a UE 310. Another air interface for UMTS that utilizes DS-CDMA, and uses time division duplexing, is the TD-SCDMA air interface. Those skilled in the art will recognize that although various examples described herein may refer to a W-CDMA air interface, the underlying principles are equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 310 provides feedback to the NodeB 308 over the HS-DPCCH to indicate whether it correctly decoded a packet on the downlink.

HS-DPCCH further includes feedback signaling from the UE 310 to assist the NodeB 308 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the NodeB 308 and/or the UE 310 may have multiple antennas supporting MIMO technology. The use of MIMO technology enables the NodeB 308 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput. On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

UE 310, which may be the same as or similar to user equipment 114 (FIG. 1), can incorporate the independent serving cell receive controller (ISCRC) 103 (FIG. 1) to perform the methodology 200 and other aspects as described herein. The UTRAN 302, which may be the same as or similar to RAN 102 (FIG. 1), can similarly incorporate the independent serving cell transmit controller (ISCTC) 101 (FIG. 1) to perform the methodology 250 and other aspects as described herein.

Figure 4:
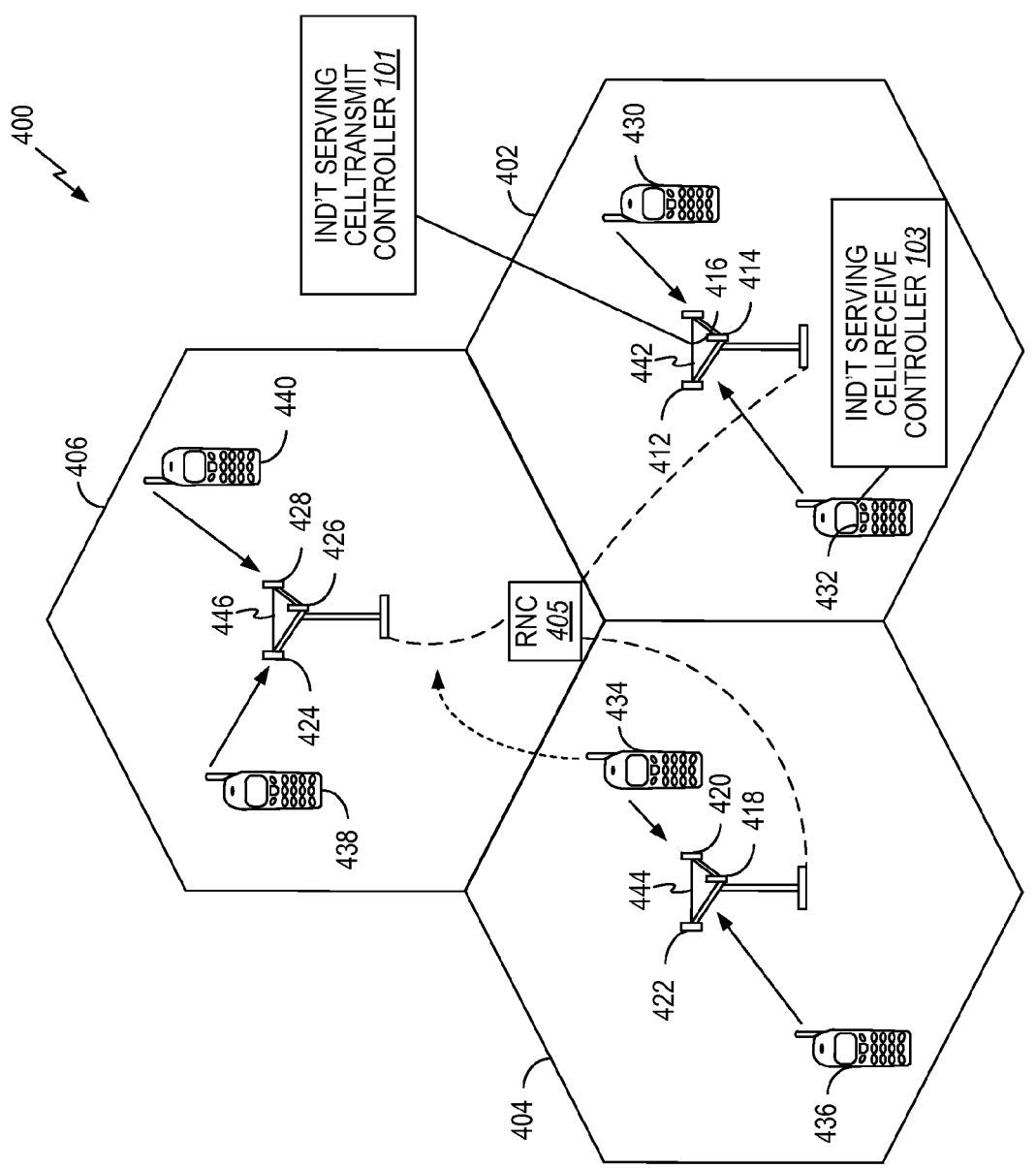
FIG. 4 is a conceptual diagram illustrating an example of one aspect of an access network.

Referring to FIG. 4, an access network 400 in UTRAN architecture is illustrated. The multiple access wireless communication system includes multiple cellular regions (cells), including cells 402, 404, and 406, each of which may include one or more sectors. The multiple sectors can be formed by groups of antennas with each antenna responsible for communication with UEs in a portion of the cell. For example, in cell 402, antenna groups 412, 414, and 416 may each correspond to a different sector. In cell 404, antenna groups 418, 420, and 422 each correspond to a different sector. In cell 406, antenna groups 424, 426, and 428 each correspond to a different sector. The cells 402, 404 and 406 may include several wireless communication devices, such as User Equipment or UEs, which may be in communication with one or more sectors of each cell 402, 404 or 406. For example, UEs 430 and 432 may be in communication with NodeB 442, UEs 434 and 436 may be in communication with NodeB 444, and UEs 438 and 440 can be in communication with NodeB 446. Here, each NodeB 442, 444, 446 is configured to provide an access point to a core network for all the UEs 430, 432, 434, 436, 438, 440 in the respective cells 402, 404, and 406.

As the UE 434 moves from the illustrated location in cell 404 into cell 406, a serving cell change (SCC) or handover may occur in which communication with the UE 434 transitions from the cell 404, which may be referred to as the source cell, to cell 406, which may be referred to as the target cell. Management of the handover procedure may take place at the UE 434, at the NodeBs corresponding to the respective cells, at a radio network controller (RNC) 405, or at another suitable node in the wireless network. For example, during a call with the source cell 404, or at any other time, the UE 434 may monitor various parameters of the source cell 404 as well as various parameters of neighboring cells such as cells 406 and 402. Further, depending on the quality of these parameters, the UE 434 may maintain communication with one or more of the neighboring cells. During this time, the UE 434 may maintain an Active Set, that is, a list of cells that the UE 434 is simultaneously connected to. For example, the UTRA cells that are currently assigning a downlink dedicated physical channel DPCH or fractional downlink dedicated physical channel F-DPCH to the UE 434 may constitute the Active Set.

The modulation and multiple access scheme employed by the access network 400 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

UE 432, which may be the same as or similar to user equipment 114 (FIG. 1), can incorporate the independent serving cell receive controller (ISCRC) 103 (FIG. 1) to perform the methodology 200 and other aspects as described herein. The NodeB 442, which may be the same as or similar to base nodes 108, 112 (FIG. 1), can similarly incorporate the independent serving cell transmit controller (ISCTC) 101 (FIG. 1) to perform the methodology 250 and other aspects as described herein.

Figure 5:
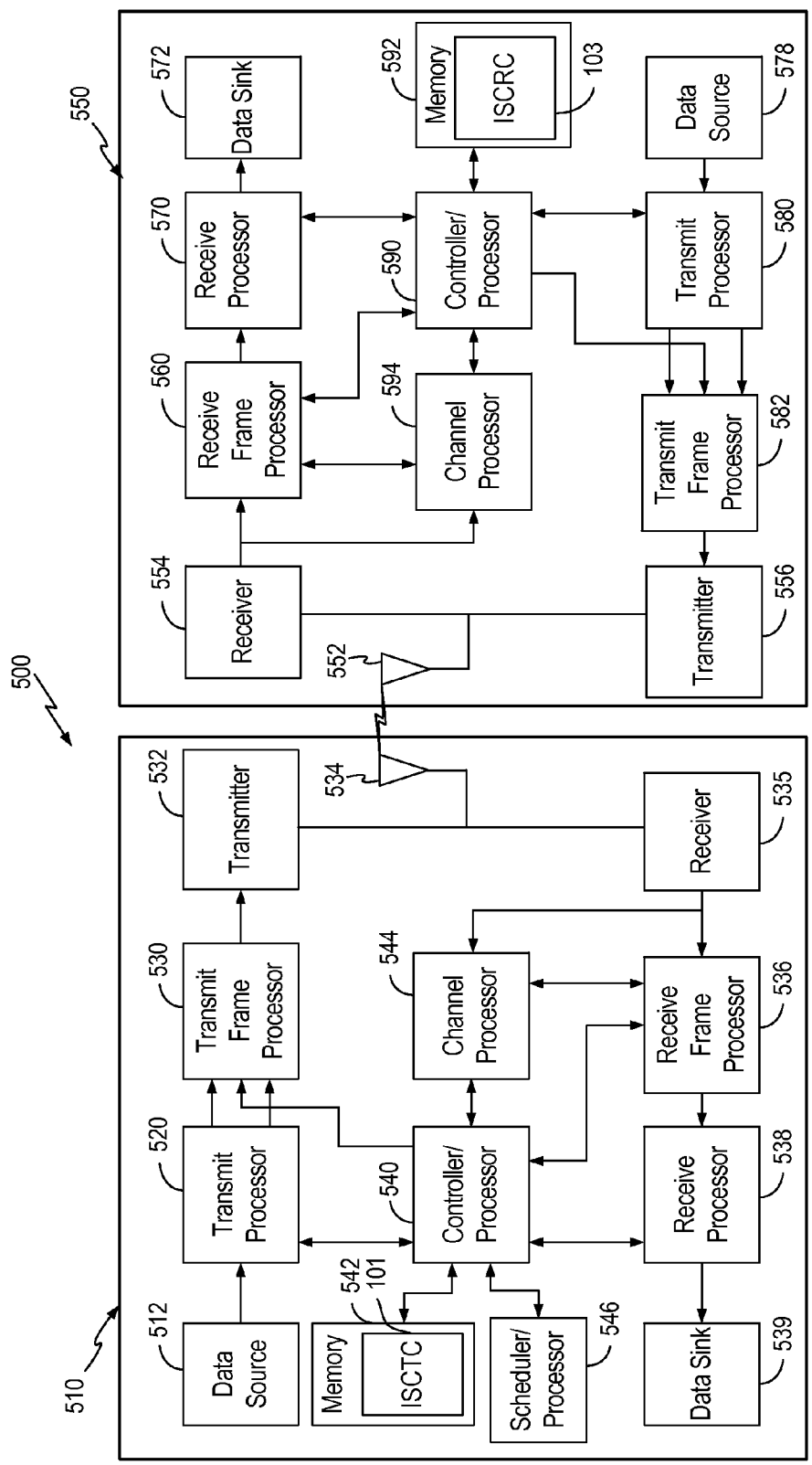
FIG. 5 is a block diagram conceptually illustrating an example of one aspect of a NodeB in communication with a UE in a telecommunications system.

FIG. 5 is a block diagram of a NodeB 510 in communication with a UE 550, where the NodeB 510 may be the RAN 102 (FIG. 1), and the UE 550 may be the user equipment 114 (FIG. 1). In the downlink communication, a transmit processor 520 may receive data from a data source 512 and control signals from a controller/processor 540. The transmit processor 520 provides various signal processing functions for the data and control signals, as well as reference signals (pilot signals). For example, the transmit processor 520 may provide cyclic redundancy check (CRC) codes for error detection, coding and interleaving to facilitate forward error correction (FEC), mapping to signal constellations based on various modulation schemes, such as binary phase-shift keying (BPSK), quadrature phase-shift keying (QPSK), M-phase-shift keying (M-PSK), M-quadrature amplitude modulation (M-QAM), and the like, spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the NodeB 510. More specifically, the receive processor 570 descrambles and despreads the symbols, and then determines the most likely signal constellation points transmitted by the NodeB 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (display). Control signals carried by successfully decoded frames will be provided to a controller/processor 590. When frames are unsuccessfully decoded by the receive processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (keyboard). Similar to the functionality described in connection with the downlink transmission by the NodeB 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the NodeB 510 or from feedback contained in the midamble transmitted by the NodeB 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the NodeB 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NAK) protocol to support retransmission requests for those frames.

The controller/processors 540 and 590 may be used to direct the operation at the NodeB 510 and the UE 550, respectively. For example, the controller/processors 540 and 590 may provide various functions including timing, peripheral interfaces, voltage regulation, power management, and other control functions. The computer readable media of memories 542 and 592 may store data and software for the NodeB 510 and the UE 550, respectively. A scheduler/processor 546 at the NodeB 510 may be used to allocate resources to the UEs and schedule downlink and/or uplink transmissions for the UEs.

UE 550, which may be the same as or similar to user equipment 114 (FIG. 1), can incorporate the independent serving cell receive controller (ISCRC) 103 (FIG. 1) to perform the methodology 200 and other aspects as described herein. The NodeB 510, which may be the same as or similar to base nodes 108, 112 (FIG. 1), can similarly incorporate the independent serving cell transmit controller (ISCTC) 101 (FIG. 1) to perform the methodology 250 and other aspects as described herein.

Figure 6:
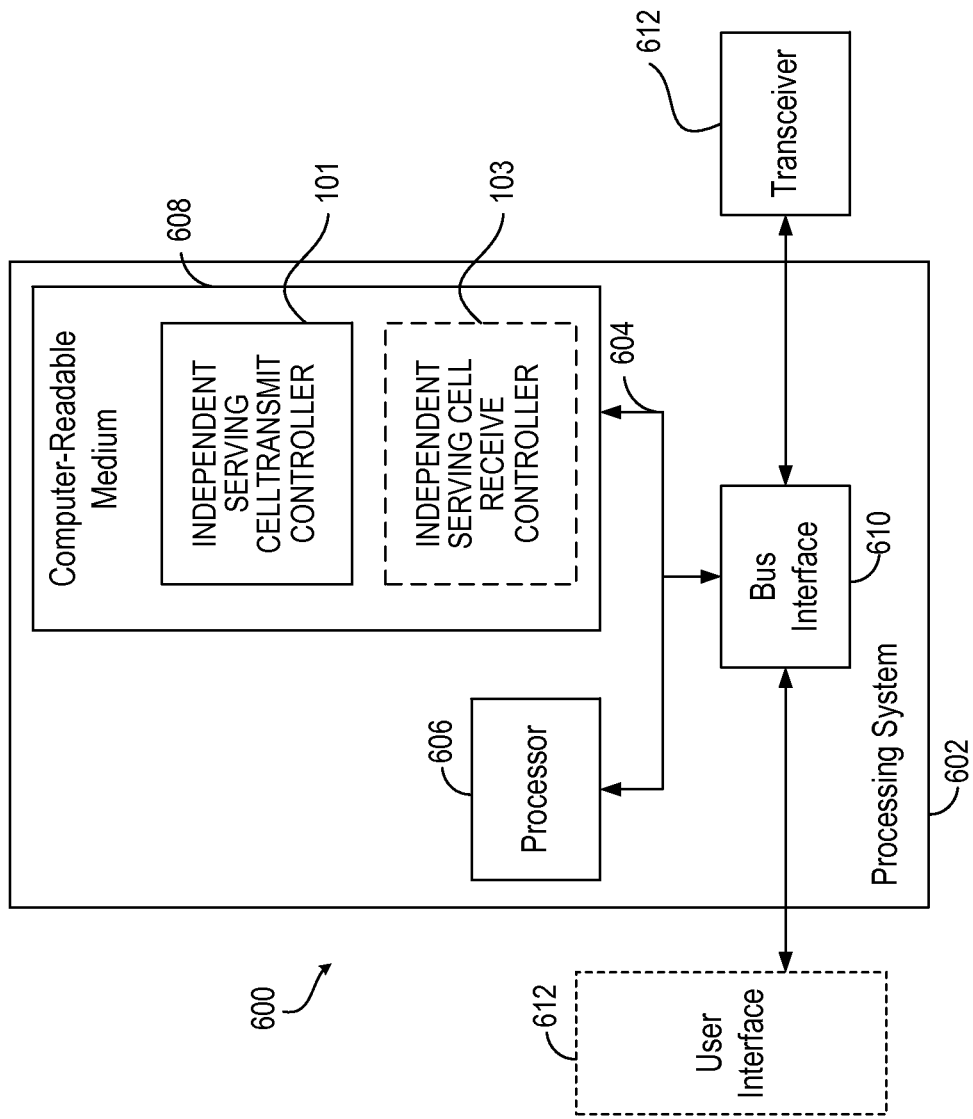
FIG. 6 is a diagram illustrating an example of one aspect of a hardware implementation for an apparatus employing a processing system.

FIG. 6 is a conceptual diagram illustrating an example of a hardware implementation for an apparatus 600 employing a processing system 602, such as for RAN 102 (FIG. 1) or user equipment 114 (FIG. 1). In this example, the processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors, represented generally by the processor 606, and computer-readable media, represented generally by the computer-readable medium 608. The bus 604 may also link various other circuits such as timing sources, peripherals, voltage regulators, and power management circuits, which are well known in the art, and therefore, will not be described any further. A bus interface 610 provides an interface between the bus 604 and a transceiver 612. The transceiver 612 provides a means for communicating with various other apparatus over a transmission medium. Depending upon the nature of the apparatus, a user interface 614, such as a keypad, display, speaker, microphone, joystick, may also be provided.

The processor 606 is responsible for managing the bus 604 and general processing, including the execution of software stored on the computer-readable medium 608. The software, when executed by the processor 606, causes the processing system 602 to perform the various functions described infra for any particular apparatus. The computer-readable medium 608 may also be used for storing data that is manipulated by the processor 606 when executing software.

The computer readable medium 608 can comprise the independent serving cell receive controller (ISCRC) 103 (FIG. 1) to perform the methodology 200 and other aspects as described herein for the user equipment 114 (FIG. 1). Alternatively, the computer readable medium 608 can comprise the independent serving cell transmit controller (ISCTC) 101 (FIG. 1) to perform the methodology 250 and other aspects as described herein for the RAN 102.

Single carrier frequency division multiple access (SC-FDMA), which utilizes single carrier modulation and frequency domain equalization, is a wireless technique which builds on OFDMA. SC-FDMA has similar performance and essentially the same overall complexity as an OFDMA system. However, an SC-FDMA signal has the advantage of a lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for the uplink multiple access scheme in 3GPP Long Term Evolution (LTE), or Evolved UTRA.

Figure 7:
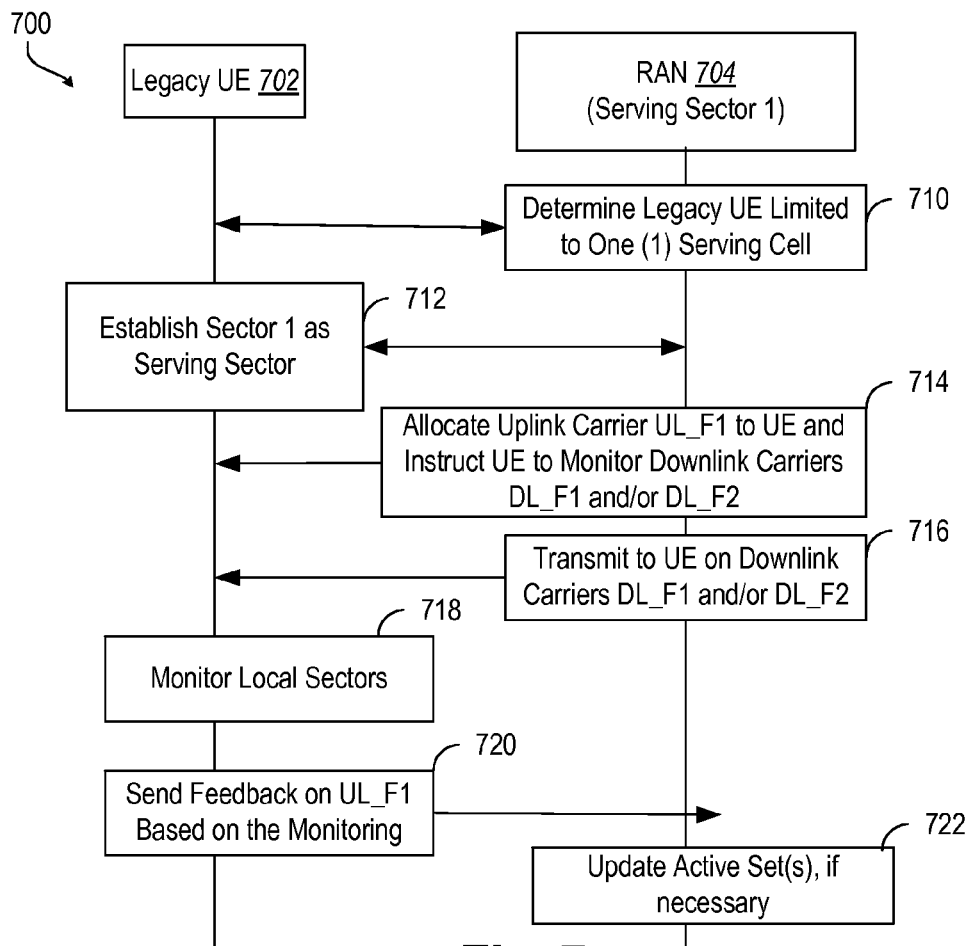
FIG. 7 illustrates one aspect of a method of transmitting data to a legacy UE on multiple carriers within a single sector.

FIG. 7 illustrates a method 700 of transmitting data to a given legacy UE 702 on multiple carriers from a single serving cell within a single sector, wherein a Radio Access Network (RAN) 704 is capable of transmitting data independently from multiple cells or sectors to the legacy UE 702. Referring to FIG. 7, the RAN 704 determines that the legacy UE 702 is limited to receiving data from a single serving cell (block 710). The legacy UE 702 establishes Sector 1 of the RAN 704 as its serving sector (block 712). For example, establishing the serving sector can include the UE monitoring and measuring pilot signal of Sector 1 and then successfully camping on Sector 1. After Sector 1 is established as the serving sector for the legacy UE 702, assume that Sector 1 allocates an uplink of carrier F1 (UL_F1) to the legacy UE 702 and also instructs the legacy UE 702 to monitor a downlink of carrier (or frequency) F1 (DL_F1) and also a downlink of carrier F2 (DL_F2) on which to receive mobile-terminated data from Sector 1 (block 714). In an example, the uplink carrier UL_F1 can be used by the legacy UE 702 to report feedback that can be used to adjust downlink transmission power and data rate from Sector 1 to the legacy UE 702. In a further example, the downlink carriers DL_F1 and DL_F2 can correspond to different frequencies that are used to communicate with the legacy UE 702 in accordance with MIMO Physical Layer in Release 7 and DC-HSDPA or Dual-Carrier DC-HSDPA in Releases 8 and/or 9. The downlink carriers DL_F1 and DL_F2 can each include a respective HS-DSCH transmitted at different frequencies on the different carriers by Sector 1. Also, the uplink carrier UL_F1 can include a High-Speed Dedicated Physical Control Carrier (HS-DPCCH) by which the legacy UE 702 can provide feedback to Sector 1.

Sector 1 of RAN 704 begins transmitting on the downlink carriers DL_F1 and DL_F2 to the legacy UE 702, and it may be assumed that the legacy UE 702 is tuned to, and receives, these downlink transmissions (block 716). In block 718, the legacy UE 702 monitors downlink pilot signals of each sector in its active set and/or from local cells or sectors in order to identify cells which are not yet in the active set of the legacy UE 702. While not shown explicitly in FIG. 7, the legacy UE 702 can also monitor and measure the downlink data transmissions on DL_F1 and DL_F2 in order to provide physical-layer (Channel Quality Indicators (CQIs) and/or H-ARQ information), which can be transmitted on a reverse-link physical-layer channel (HS-DPCCH). As will be appreciated the measurements made by the legacy UE 702 can result in mobility events that can result in changes to the active set of the legacy UE 702.

After monitoring the downlink pilot signals for a period of time in block 718, the legacy UE 702 sends channel feedback, on the uplink carrier UL_F1, to Sector 1 (block 720). For example, the channel feedback can include one or more of averaged signal strength of each of the monitored downlink pilot signals and/or an average pilot Signal-to-Interference Ratio (SIR) of each of the monitored downlink pilot signals. The channel feedback can be forwarded to the serving RNC at the RAN 704, which uses the channel feedback perform mobility management, including changes to the active set. The channel feedback can be sent in Radio Resource Control (RRC) messages, which are treated as data by the physical layer. Sector 1 of the RAN 704 receives the HS-DPCCH feedback on the uplink carrier UL_F1 from the legacy UE 702 and forwards the channel feedback to the serving RNC, and, if necessary, the serving RNC updates the active set of the legacy UE 702 based on the feedback (block 722).

Figure 8:
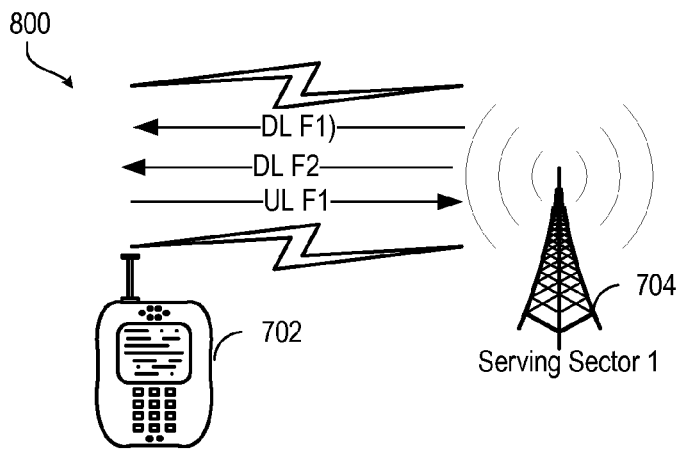
FIG. 8 illustrates one aspects of the connections that are established between a given user equipment (UE) and a serving sector during the method of FIG. 7.

FIG. 8 illustrates a wireless communication system 800 depicting connections that are established between the legacy UE 702 and Sector 1 of RAN 704 of FIG. 7. Accordingly, FIG. 8 illustrates the two (2) downlink carriers DL_F1 and DL_F2 from Sector 1 to the legacy UE 702, and FIG. 8 also illustrates the uplink carrier UL_F1 from the legacy UE 702 to Sector 1 of RAN 704.

While communicating with target UEs on multiple frequency bands within a single serving sector can improve throughput as compared to communicating with the same UEs on a single frequency band of the single serving sector, aspects of the present innovation are directed to further improving throughput via communication between multiple serving sectors and at least one target UE. In the aspects described below, the target UE can be allocated a single uplink carrier (UL_F1 or UL_F2) on which to send physical-layer feedback (HS-DPCCH feedback such as CQIs and H_ARQ information) for each of its carriers (collectively forming a single 'carrier group') on the multiple serving sectors, such as in FIG. 9A, or alternatively can be allocated multiple uplink carriers (UL_F1 and UL_F2) on which to send the physical-layer feedback for different 'groups' of its carriers, which can be distributed among different sectors, such as in FIG. 9B. Also, the channel feedback, such as the measured averaged signal strength of and average pilot SIR of local downlink pilot signals from sectors near the UE 902 can be sent in RRC messages which can be sent over any of the available uplink carriers.

Figure 9A:
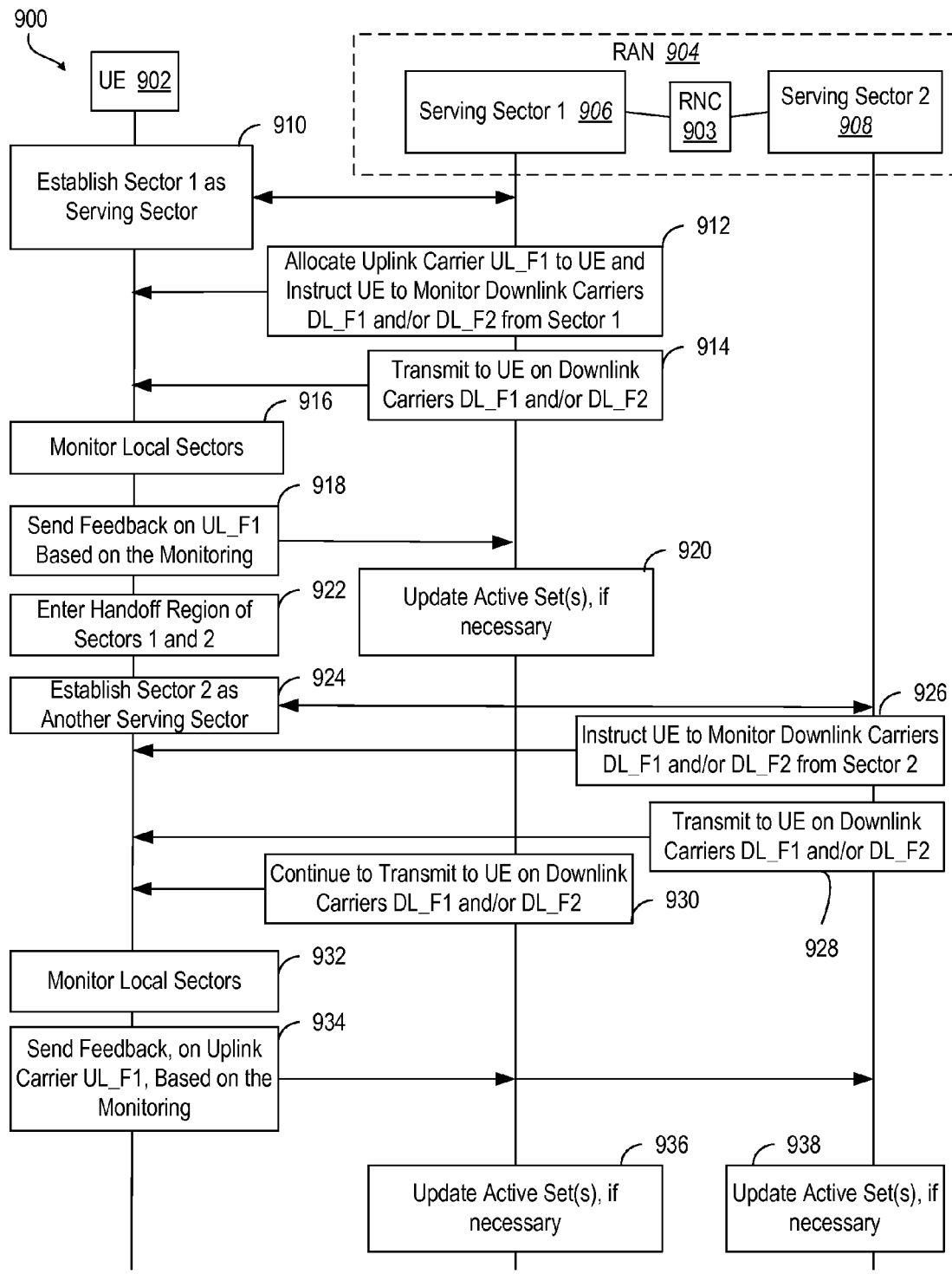
FIG. 9A illustrates a method of transmitting data to a UE via multiple serving sectors in accordance with an aspect of the present innovation.

FIG. 9A illustrates a method 900 of transmitting data to a given UE via multiple serving sectors in accordance with an aspect of the present innovation. Referring to FIG. 9A, an RNC 903 and UE 902 establish Sector 1 906 of a RAN 904 as the serving sector (block 950). For example, establishing Sector 1 906 can include the UE 902 monitoring and measuring pilot signal of Sector 1 906 and then successfully camping on Sector 1 906. After Sector 1 906 is established as the serving sector for the UE, assume that Sector 1 906 allocates an uplink carrier (UL_F1) to the UE 902 and also instructs the UE 902 to monitor one or more downlink carriers (or frequencies) DL_F1 and DL_F2 on which to receive mobile-terminated data from Sector 1 906 (block 916). As will be described in greater detail below with respect to the illustrative implementation examples of FIGS. 10A-10G, Sector 1 906 can either communicate with the UE 902 on a single downlink carrier (DL_F1 or DL_F2, but not both), or alternatively can communicate with the UE 902 on both carriers concurrently (DL_F1 and DL_F2).

In an example, the uplink carrier UL_F1 can be used by the UE 902 to report channel feedback) that can be used to by the serving RNC to maintain the active set(s) for the UE. For example, a measured signal strength and/or SIR associated with local cells or sectors by which the active set controlled by UL_F1 can be updated. In a further example, the downlink carriers DL_F1 and DL_F2 can correspond to different frequencies that are used to communicate with the UE 902 in accordance with MIMO Physical Layer in Release 7 and DC-HSDPA or Dual-Carrier DC-HSDPA in Releases 8 and/or 9. The downlink carriers DL_F1 and DL_F2 can include two HS-DSCHs that are transmitted at different frequencies by Sector 1 906. Also, the uplink carrier UL_F1 can include a High-Speed Dedicated Physical Control Channel (HS-DPCCH).

Referring to FIG. 9A, Sector 1 906 begins transmitting on the downlink carriers DL_F1 and DL_F2 to the UE (block 914). The UE 902 monitors downlink pilot signals of each sector in its active set and/or from local cells or sectors in order to identify cells which are not yet in the active set of the UE (block 916). As will be appreciated, the measurements made by the UE 902 can result in mobility events that, when reported to the network, can cause the serving RNC 903 to make changes to the active set of the UE 902. For example, the measurements made by the UE 902 in block 916 with and without compressed mode (CM) operation can be configured in the same way as in Rel. 8, Rel. 9 and Rel. 10. After monitoring the downlink pilot signals for a period of time in block 916, the UE 902 sends channel feedback, on the uplink carrier UL_F1, to Sector 1 906 (block 918). For example, the channel feedback can include averaged signal strength of each of the monitored downlink pilot signals and/or an average pilot SIR of each of the monitored downlink pilot signals based on measurements taken by the UE 902 at block 916. Sector 1 906 of the RAN 904 receives the channel feedback on the uplink carrier UL_F1 from the UE 902 and forwards the mobility to the serving RNC, and, if necessary, the serving RNC 903 updates the active set(s) for the UE 902 based on the channel feedback (block 920).

While not shown explicitly in FIG. 9A, the UE 902 can also monitor and measure the downlink data transmissions on DL_F1 and/or DL_F2 from Sector 1 906 in order to provide physical-layer feedback (Channel Quality Indicators (CQIs) and/or H-ARQ information), which can be transmitted on a reverse-link physical-layer channel (HS-DPCCH) of UL_F1 to Sector 1 906 and then used by Sector 1 906 (which is in an active set of the UE) to adjust a data rate and/or a transmission power level on DL_F1 and/or DL_F2 from Sector 1 906.

At some later point in time, assume that the UE 902 enters a handover region between its current serving Sector 1 906 and another sector ("Sector 2 908") (block 922). As will be appreciated by one of ordinary skill in the art, 'soft handover' as is used in other wireless protocols is not conventionally supported by HSDPA since HSDPA was introduced in Release 5. Rather, HSDPA in Release 5+ supports a form of 'hard handover' on the downlink-side such that only one serving cell is transmitting to a target UE 902 at any given time, even when the target UE 902 is in the method of handing off to a new serving cell. In other words, conventionally, there is no overlapping period of coverage by multiple cells for the target UE 902 in HSDPA Release 5+.

Turning back to the aspects of FIG. 9A, upon adding both Sectors 1 and 2 906, 908 as serving sectors of the UE 902 at block 924, each of Sectors 1 and 2 906, 908 can be provided with different mobile terminated data, from the serving RNC 903 of the RAN 904, for transmission to the UE 902. From the perspective of the uplink, Sectors 1 and 2 906, 908 (as well as any other sectors in an active set of the UE 902) will be monitoring for UE-transmissions on their respective carriers (UL_F1 and/or UL_F2). In an illustrative version, Sector 2 908 is selected as a serving cell or sector for the UE 902 based in part on the presence of Sector 2 908 within an active set of the UE 902. As will be appreciated, in an example, the active set is closely associated with the uplink power control and scheduling grant calculation, and the number of active sets must be equal to, or less than the number of uplink carriers allocated to the UE. Therefore, as an example, the maximum number of serving cells across all the downlink carriers is equal to, or less than the number of uplink carriers.

Accordingly, after Sector 2 908 is established as a second serving sector for the UE, assume that Sector 2 908 instructs the UE 902 to monitor one or more downlink carriers (or frequencies) DL_F1 and DL_F2 on which to receive mobile-terminated data from Sector 2 908 (block 926). As will be described in greater detail below with respect to the illustrative implementation examples of FIGS. 10A-10G, Sector 2 908 can either communicate with the UE 902 on a single downlink carrier (DL_F1 or DL_F2, but not both), or alternatively can communicate with the UE 902 on both carriers concurrently (DL_F1 and DL_F2). As will be appreciated, the mobile-terminated data that is forwarded for transmission by Sectors 1 and 2 906, 908 need not be the same, and the amount of data also need not be the same. Rather, the serving RNC controlling Sectors 1 and 2 906, 908 can engage in load-balancing in order to distribute data for transmission to the UE 902 between Sectors 1 and 2 906, 908, and also between DL_F1 and/or DL_F2 among Sectors 1 and 2 906, 908, in an appropriate manner. This can involve the serving RNC 903 taking into account the current loading on the different sectors as well as the different carriers, as well as other factors such as which sector is 'primary' and which sector is 'secondary' for a particular carrier, as will be discussed in more detail below.

Referring to FIG. 9A, Sector 2 908 begins transmitting on the downlink carriers DL_F1 and/or DL_F2 to the UE (block 928), and Sector 1 906 continues to transmit on the downlink carriers DL_F1 and/or DL_F2 to the UE (block 930). In blocks 928 and 930, it may be assumed that the UE 902 is tuned to, and receives, these downlink transmissions.

In block 932, the UE 902 monitors downlink pilot signals of each sector in its active set and/or from local cells or sectors in order to identify cells which are not yet in the active set of the UE. As will be appreciated the measurements made by the UE 902 can result in mobility events that, when forwarded to the serving RNC, can cause the serving RNC to make changes to the active set of the UE. For example, the measurements made by the UE 902 in block 932 with and without compressed mode (CM) can be configured in the same way as in Rel. 8, Rel. 9 and Rel. 10. After monitoring the downlink pilot signals for a period of time in block 932, the UE 902 sends channel feedback, on the uplink carrier UL_F1 (block 934). For example, the channel feedback can include averaged signal strength of each of the monitored downlink pilot signals and/or an average pilot SIR of each of the monitored downlink pilot signals based on measurements taken by the UE 902 in block 932. In the aspects of FIG. 9A, it may be assumed that Sectors 1 and 2 906, 908 of the RAN 904 receive the channel feedback on the uplink carrier UL_F1 from the UE 902. For example, Sectors 1 and 2 906, 908 can each be in an active set of UL_F1, which means that Sectors 1 and 2 906, 908 are actively monitoring for uplink transmissions from the UE 902 on UL_F1. Thus, when the UE 902 transmits on UL_F1 in block 934, both Sectors 1 and 2 906, 908 receive the transmission. At this point, each of Sectors 1 and 2 906, 908 forward the channel feedback to the serving RNC 903, if necessary, the serving RNC 903 updates the active set(s) for the UE 902 based on the channel feedback (block 936, 938).

While not shown explicitly in FIG. 9A, the UE 902 can also monitor and measure the downlink data transmissions on DL_F1 and/or DL_F2 from Sectors 1 and 2 906, 908 in order to provide physical-layer feedback, such as Channel Quality Indicators (CQIs) and/or H-ARQ information, which can be transmitted on a reverse-link physical-layer channel, such as HS-DPCCH, of UL_F1 to Sectors 1 and 2 906, 908 and then used by Sectors 1 and 2 906, 908 to adjust a data rate and/or a transmission power level on DL_F1 and/or DL_F2 from the respective sectors.

Figure 9B:
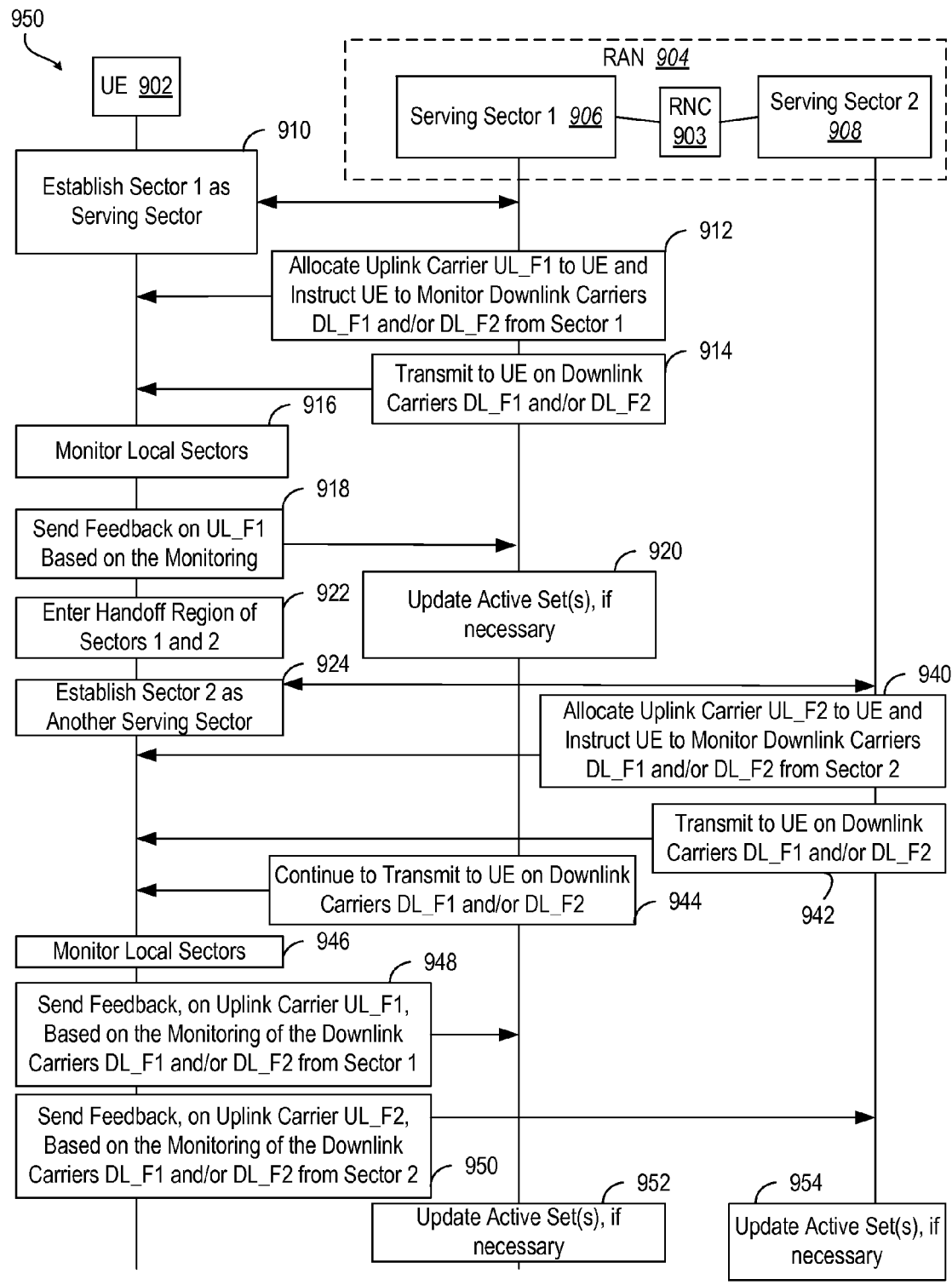
FIG. 9B illustrates a method of transmitting data to a UE via multiple serving sectors in accordance with another aspect of the present innovation.

In the aspects of FIG. 9A discussed above, the UE 902 is allocated a single uplink carrier UL_F1 on which to send physical-layer feedback to the serving Sectors 1 and 2 906, 908. Thus, in terms of power control, the downlink carriers DL_F1 and/or DL_F2 from Sectors 1 and 2 906, 908 are part of the same 'carrier group' in the sense that each carrier from each sector is controlled based on physical-layer feedback from the single uplink carrier UL_F1 (i.e., an 'anchor' carrier). In the aspects of FIG. 9B that is described next, the UE 902 is allocated multiple uplink carriers on which to provide feedback. In this version, a different carrier group can be associated with each uplink carrier assigned to the UE.

FIG. 9B illustrates another method of transmitting data to a UE 902 via multiple serving sectors in accordance with an aspect of the present innovation. Referring to FIG. 9B, blocks 910-924 are as described for FIG. 9A, and as such will not be described further for the sake of brevity.

Referring to FIG. 9B, after adding Sector 2 908 as an additional serving sector in block 924, Sector 2 908 instructs the UE 902 to monitor one or more downlink carriers (or frequencies) DL_F1 and DL_F2 on which to receive mobile-terminated data from Sector 2 908, block 940, which is similar to block 926 of FIG. 9A. However, unlike FIG. 9A, Sector 2 908 also allocates a second uplink carrier (UL_F2) to the UE 902 in block 940.

Referring to FIG. 9B, Sector 2 908 begins transmitting on the downlink carriers DL_F1 and/or DL_F2 to the UE (block 942), and Sector 1 906 continues to transmit on the downlink carriers DL_F1 and/or DL_F2 to the UE (block 944). In blocks 942, 944, the UE 902 is tuned to, and receives, these downlink transmissions. In block 946, the UE 902 monitors downlink pilot signals of each sector in its active set and/or from local cells or sectors in order to identify cells which are not yet in the active set of the UE 902. As will be appreciated the measurements made by the UE 902 can result in mobility events that, when forwarded to the serving RNC 903, can cause the serving RNC 903 to changes to the active set of the UE 902. For example, the measurements made by the UE 902 in block 946 with and without compressed mode (CM) can be configured in the same way as in Rel. 8, Rel. 9 and Rel. 10.

As discussed briefly above, each of the uplink carriers UL_F1 and UL_F2 can be associated with its own active set and its own carrier group, with the respective carrier groups corresponding to a set of sectors whose downlink transmission power and/or data rate is controlled in part based upon physical-layer feedback provided from one of the uplink carriers UL_F1 or UL_F2. When there are two or more uplink carriers, as in FIG. 9B, the respective carrier groups are configured by the network (i.e., by a serving RNC 903 of the network controlling Sectors 1 and 2 906, 908) such that carriers within the same carrier group have a similar coverage area. For example, carriers supported by the same serving sector can collectively form part of a carrier group. In FIG. 9B, since the two uplink carriers UL_F1 and UL_F2 in DC HSUPA shall each have their own active set, there are two carrier groups (unless an anchor carrier is used on the uplink).

In an example, each of the two uplink carriers UL_F1 and UL_F2 can independently control their respective carrier groups (in terms of modifications to data rate and/or transmission power). Alternatively, one of the uplink carriers can include the 'anchor' carrier and the other uplink carrier includes at least the carrier which is paired with the secondary uplink carrier. The other 'unpaired' downlink carriers can be put into either of the two carrier groups. The grouping can be implemented in such a way that the carriers in the same carrier group have similar handover boundary.

The measurements of the downlink pilot signals made by the UE 902 in block 946 can trigger 'mobility events'. In terms of mobility, in the anchor carrier version, each mobility event (or each trigger for a potential active set change, such as a soft handover, a transition to new or different serving cell, a dropping of an old serving cell, etc.) can be based on the anchor carrier (UL_F1). In this case, the secondary uplink carrier (UL_F2) is treated as 'non-used' and event 2x is to be used for the measurements. The capability of a UE 902 to measure the secondary uplink carrier without compressed mode (CM) can be beneficial to identify new cells on this frequency. As an example, assuming that UL_F1 is the uplink anchor carrier, as the UE 902 moves from Sector 1 906 to Sector 2 908, service from DL_F1 on Sector 1 906 can only be added when DL_F2 of Sector 1 906 is added to the active set of UL_F2. New mobility events may also prompt the UE 902 to report the DL_F2 strength while UL_F1 is the anchor carrier.

In an alternative version, instead of triggering reports from the UE 902 based on the channel quality of cells on the anchor frequency alone, reports can also be triggered from the UE 902 based on measured channel quality on other non-anchor frequencies, which can help with uneven loading in the network.

In another alternative version, mobility event management can be implemented via a per carrier group basis, instead of via a single anchor carrier. As noted above, the active set is maintained per carrier group. In an example, assume that the UE maintains two independent active sets (one for each carrier group), and the search on both carrier groups can be conducted without CM. In this case, when the UE 902 is moving away from Sector 2 908 and towards Sector 1 906, service on DL_F1 from Sector 1 906 can be added when DL_F1 on Sector 1 906 is added to the active set on UL_F1, instead of when DL_F2 on Sector 1 906 is added to the active set of UL_F2. This results in a larger extension of DL_F1 service from Sector 1 906. This option may require DC-HSUPA support. Moreover, the issue of physical layer feedback channel on the uplink can be mitigated by allowing the HS-DPCCH for each downlink carrier (DL_F1, DL_F2) to be carried separately on each of the paired uplink carrier (UL_F1, UL_F2).

As will be described in greater detail below with respect to the illustrative implementation examples of FIGS. 10A-10G, Sector 2 908 can either communicate with the given UE 902 on a single downlink carrier (DL_F1 or DL_F2, but not both), or alternatively can communicate with the given UE 902 on both carriers concurrently (DL_F1 and DL_F2). The downlink carriers DL_F1 and DL_F2 in Sector 2 908 (if present) can be considered to be configured in a substantially similar manner to the downlink carriers DL_F1 and DL_F2 in Sector 1 906 (if present), except for being transmitted from a different serving sector of the given UE.

Turning back to FIG. 9B, after monitoring the downlink pilot signals for a period of time in block 946, the given UE 902 sends channel feedback on the uplink carrier UL_F1 to Sector 1 906 (block 948), and also separately sends channel feedback on the uplink carrier UL_F2 to Sector 2 908 (block 950). Thus, the illustrated version of FIG. 9B corresponds to the non-anchor carrier version, whereby the carrier groups for UL_F1 and UL_F2 are controlled separately. While not shown in FIG. 9B, an alternative to this approach is the anchor carrier version (described in more detail below) whereby a single uplink carrier (UL_F1 or UL_F2) can be used to provide channel feedback for both carrier groups (i.e., the measured pilots of both carrier groups can be sent over the anchor carrier). In an example, the uplink carrier UL_F1 is associated with a first carrier group that includes at least the downlink carriers DL_F1 and/or DL_F2 in Sector 1 906, and the uplink carrier UL_F2 is associated with a second carrier group that includes at least the downlink carriers DL_F1 and/or DL_F2 in Sector 2 908. Further, the channel feedback sent in block 948 and 950 can include averaged signal strength of each of the monitored downlink pilot signals and/or an average pilot SIR of each of the monitored downlink pilot signals based on measurements taken by the given UE 902 in block 946.

While not shown explicitly in FIG. 9B, the given UE 902 can also monitor and measure the downlink data transmissions on DL_F1 and/or DL_F2 from Sectors 1 and 2 906, 908 in order to provide physical-layer feedback, such as Channel Quality Indicators (CQIs) and/or H-ARQ information, which can be transmitted on a reverse-link physical-layer channel (HS-DPCCH) of UL_F1 and/or UL_F2 to Sectors 1 and 2 906, 908 and then used by Sectors 1 and 2 906, 908 to adjust a data rate and/or a transmission power level on DL_F1 and/or DL_F2 from the respective sectors. The multiple uplink carriers UL_F1 and UL_F2 can permit the given UE 902 to code the HS-DPCCH information of carriers in the same carrier group is coded together and sent over the uplink carrier corresponding to this carrier group. For example, if the UE 902 has two downlink carriers (DL_F1 and DL_F2) and two uplink carriers (UL_F1 and UL_F2); this option would encode the HS-DPCCH for the two downlink carriers (DL_F1 and DL_F2 in Sectors 1 and/or 2) onto the two uplink carriers.

Turning back to FIG. 9B, Sector 1 906 of the RAN 904 receives the channel feedback on the uplink carrier UL_F1 from the given UE 902 and forwards the channel feedback to the serving RNC, and, if necessary, the serving RNC adjusts the active set of the given UE 902 for UL_F1 based on the channel feedback (block 952). Likewise, Sector 2 908 of the RAN 904 receives the feedback on the uplink carrier UL_F2 from the given UE 902 and forwards the channel feedback to the serving RNC, and, if necessary, the serving RNC adjusts the active set of the given UE 902 for UL_F2 based on the feedback (block 954).

Further, each of FIGS. 9A and 9B illustrate a scenario whereby the given UE 902 establishes Sector 1 906 as an initial serving sector, and later adds Sector 2 908 as another serving sector upon entry by the given UE 902 into a handover zone or region between Sectors 1 and 2 906, 908. In an alternative version, the given UE 902 could simply power up in the handover zone or region between Sectors 1 and 2 906, 908, in which case both Sectors 1 and 2 906, 908 could be set-up as serving sectors of the UE 902 in parallel.

Further, the NodeBs associated with Sectors 1 and 2 906, 908 in FIGS. 9A and 9B can have different transmission power capabilities. For example, the NodeB supporting Sector 1 906 can support Sector 1 906 as a macro-cell, a micro-cell or a pico-cell, which can result in a different transmission power capacity as compared to the NodeB supporting Sector 2 908. Such transmission power capability disparities can result in scenarios whereby allowing different serving cells to operate on different carriers can improve throughput.

In an alternative version, as mentioned above, instead of sending separate feedback (channel feedback or physical-layer feedback) for the two carrier groups on the uplink channels UL_F1 and UL_F2, one of the plurality of uplink carriers can be designated as an 'anchor' uplink carrier. In this case, with respect to physical-layer feedback, the HS-DPCCH information for each of the downlink carriers (DL_F1 and/or DL_F2 from Sector 1 906, DL_F1 and/or DL_F2 from Sector 2 908, etc.) can be jointly coded into one code word (as in Rel. 8 for DC HSDPA or in Rel. 9 for DC HSDPA with MIMO and DB DC HSDPA, or in Rel. 10 for 4C HSDPA), and then sent over the anchor uplink carrier. As will be appreciated, if a single anchor carrier is used on behalf of multiple carrier groups, the serving sector associated with the anchor carrier can forward the UE feedback (to the other serving sector(s)) or the anchor carrier can be monitored by each of the carriers concurrently, for example at least, each carrier in an active set of the anchor carrier.

Below, a number of implementation examples of the processes of FIGS. 9A and 9B are provided with respect to FIGS. 10A-10G. More specifically, each of FIGS. 10A-10G illustrate a different set of connections that can be established between the UE 902 and the serving Sector 1 906 and Sector 2 908 of FIG. 9A-9B.

Figure 10A:
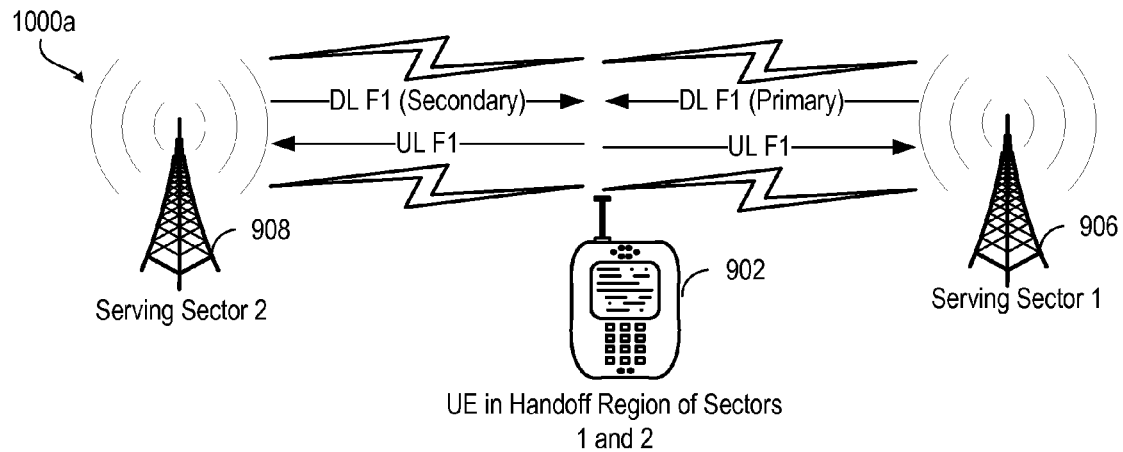
FIGS. 10A-10G each illustrate a block diagram of one aspect of connections that are established between the given UE and multiple serving sectors in accordance with the methods of FIG. 9A-9B.

In FIG. 10A, a communication system 1000a is illustrated in accordance with an implementation example of the method of FIG. 9A, whereby each of serving Sectors 1 and 2 906, 908 communicate with the UE 902 via the same, single downlink carrier (i.e., DL_F1), and the UE 902 is assigned a single uplink carrier (i.e., UL_F1) on which to provide feedback for the carrier group. Thus, in the example of FIG. 10A, the second downlink carrier DL_F2 is not used. As will be appreciated, the omission of the downlink carrier DL_F2 can be based on a failure of the serving Sectors 1 and/or 2 to support the downlink carrier DL_F2 (Sectors 1 and 2 906, 908 are implemental via single carrier frequency deployment), or alternatively can be based on a determination by a serving RNC that a load-level for the downlink carrier DL_F2 is above a threshold, such that resources for supporting the UE 902 on the downlink carrier DL_F2 are not currently available.

Referring to FIG. 10A, assume that Sector 1 906 corresponds to a 'primary' sector for the downlink carrier DL_F1, and that Sector 2 908 corresponds to a 'secondary' serving sector for the downlink carrier DL_F1. In aspects of the present innovation, each particular downlink carrier can be supported by a single primary serving sector and at least one secondary serving sector. Generally, the primary serving sector is more permanent than the secondary serving sector(s) for a particular downlink carrier. Also, the RNC can direct more downlink mobile-terminated data to the primary serving sector as opposed to the secondary serving sector. In a further example, the primary serving sector can be associated with a lower load for the associated carrier and/or can have a better connection to the UE 902 as compared to the secondary serving sector. The downlink carrier DL_F1 in Sectors 1 and 2 906, 908 each carry a distinct HS-DSCH that can be monitored by the UE 902. In this case, two distinct transport blocks can be conveyed from Sectors 1 and 2 906, 908 to the UE 902 via the two HS-DSCHs on the same carrier or frequency (i.e., DL_F1). In other words, different data is being transmitted within the same carrier by the different sectors (i.e., contrasted with soft handover in non-HSDPA protocols whereby the same data is redundantly transmitted in the handover region). This type of transmission scheme can be referred to as Single-Frequency Dual-Cell HSDPA (SF-DC-HSDPA). As will be appreciated, SF-DC-HSDPA can provide dynamic load balancing in a realistic deployment where the system is infrequently fully utilized. As shown in FIG. 10A, each of the primary serving Sector 1 906 and the secondary serving Sector 2 908 can monitor and receive signals from the UE 902 that are transmitted on the uplink carrier UL_F1.

Figure 10B:
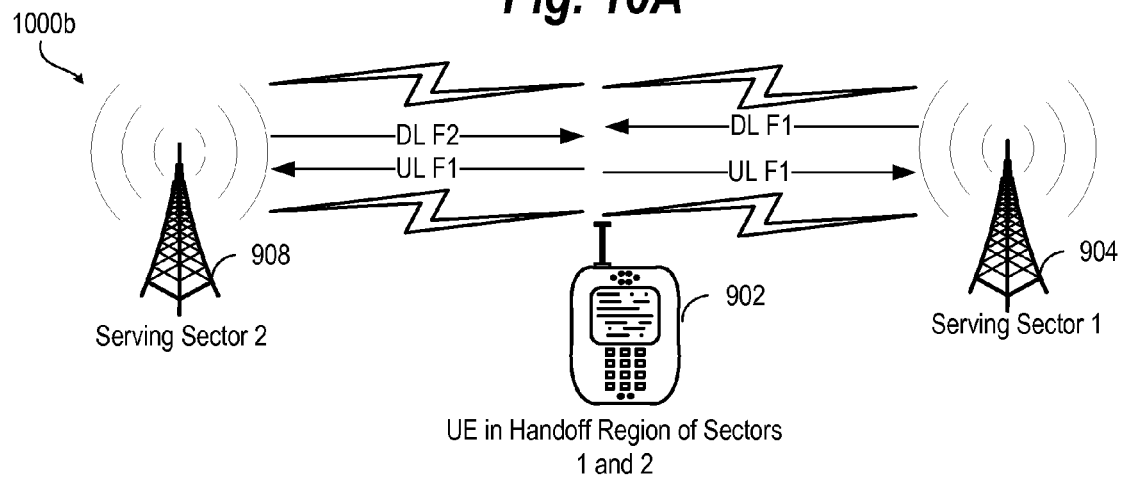

In FIG. 10B, a communication system 1000b is illustrated in accordance with an implementation example of the method of FIG. 9A, whereby each of serving Sectors 1 and 2 906, 908 communicate with the UE 902 via the a single downlink carrier (i.e., DL_F1 and DL_F2, respectively), and the UE 902 is assigned a single uplink carrier (i.e., UL_F1) on which to provide feedback for the carrier group. Thus, in the example of FIG. 10B, the downlink carrier frequencies DL_F1 and DL_F2 used by Sectors 1 and 2 906, 908, respectively, can be orthogonal to each other so as to reduce interference at the UE 902. Referring to FIG. 10B, assume that the downlink carrier DL_F1 in Sector 1 906 and the downlink carrier DL_F2 in Sector 2 908 each carry a distinct HS-DSCH that can be monitored by the UE 902. In this case, two distinct transport blocks can be conveyed from Sectors 1 and 2 906, 908 to the UE 902 via the two HS-DSCHs on the different carriers or frequencies (i.e., DL_F1 and DL_F2). In the illustrative version of FIG. 10B, because serving Sector 1 906 communicates with the UE 902 via DL_F1 and serving Sector 2 908 communicates with the UE 902 via DL_F2, both serving Sectors 1 and 2 906, 908 are 'primary' with respect to their particular downlink carriers because there are no secondary carriers in FIG. 10B. As shown in FIG. 10B, each of the serving Sector 1 906 and the serving Sector 2 908 can monitor and receive signals from the UE 902 that are transmitted on the uplink carrier UL_F1, even though serving Sector 2 908 is not transmitting on DL_F1. In an example, serving Sector 2 908 may be overloaded, resulting in failure of serving Sector 2 908 to provide downlink support on DL_F1 while still being able to decode the feedback of the UE 902 transmitted upon UL_F1 as the anchor carrier.

Further, referring to FIG. 10B, in another example, assume that both Sectors 1 and 2 906, 908 support both of the downlink carriers DL_F1 and DL_F2. However, further assume that DL_F2 on Sector 1 906 and DL_F1 on Sector 2 908 are heavily loaded, while DL_F1 on Sector 1 906 and DL_F2 on Sector 2 908 are lightly loaded. In this case, serving the UE 902 from Sector 1 906 on DL_F1 and from Sector 2 908 on DL_F2 (as shown in FIG. 10B) will result in increased throughput. As will be appreciated, there are many different scenarios whereby serving the UE 902 on different carriers from different sectors can improve service to the UE 902.

Figure 10C:
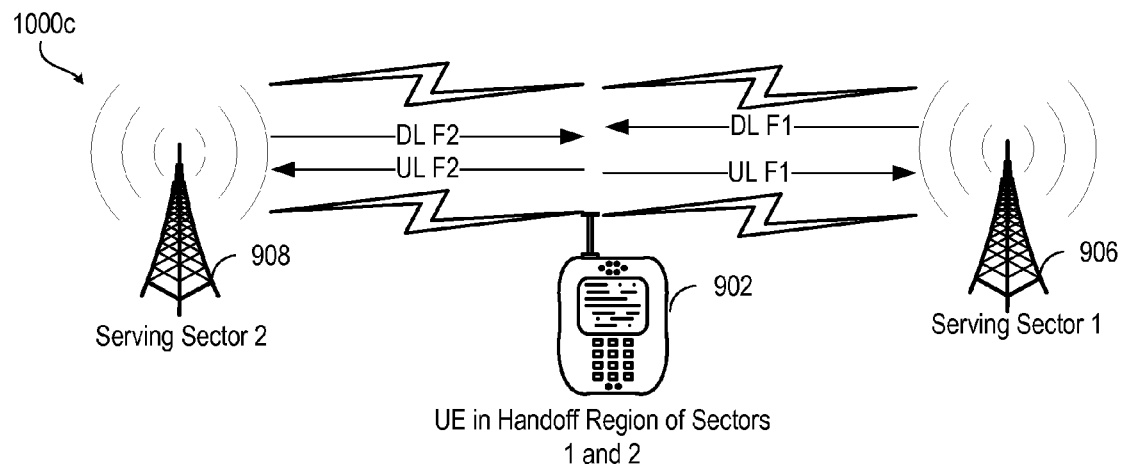

In FIG. 10C, a communication system 1000c is illustrated in accordance with an implementation example of the method of FIG. 9B, whereby each of serving Sectors 1 and 2 906, 908 communicate with the UE 902 via a single (and different) downlink carrier (i.e., DL_F1 and DL_F2, respectively), and the UE 902 is assigned two uplink carriers (i.e., UL_F1 and UL_F2) on which to provide feedback for the respective carrier groups (i.e., a first carrier group including at least DL_F2 of Sector 2 908, and a second carrier group including at least DL_F1 of Sector 1 906). The example of FIG. 10C is similar to the example described above with respect to FIG. 10B, except that FIG. 10C provisions the UE 902 with two uplink carriers (UL_F1 and UL_F2) instead of the single uplink carrier (UL_F1) from FIG. 10B, resulting in two distinct carrier groups and active sets for the UE 902. Accordingly, the two uplink carriers (UL_F1 and UL_F2) permit the UE 902 to control two distinct carrier groups either separately via UL_F1 and UL_F2, as described above with respect to FIG. 9B. For example, the uplink carrier UL_F1 can provide feedback in association with a first carrier group including at least the downlink carrier DL_F1 on Sector 1 906, and the uplink carrier UL_F2 can provide feedback in association with a second carrier group including at least the downlink carrier DL_F2 on Sector 2 908.

Alternatively, referring to FIG. 10C, even though the two uplink carriers UL_F1 and UL_F2 are provisioned to the UE 902, feedback for both carrier groups can be provided via a single anchor carrier (UL_F1 or UL_F2). In this case, both Sectors 1 and 2 906, 908 are in the active set for the anchor carrier so that the feedback on the anchor carrier will be decoded properly by both sectors. A further description of FIG. 10C will be omitted for the sake of brevity, due to its similarity to FIG. 10B.

Referring to FIG. 10C, in an example, assume that Sector 1 906 corresponds to a hotspot that supports both downlink carriers DL_F1 and DL_F2, while Sector 2 908 supports only the downlink carrier DL_F2. In this case, when the UE 902 is positioned in a handover region between Sectors 1 and 2 906, 908, and is closer to Sector 2 908 than Sector 1 906, higher throughout can be attained by serving the UE 902 from Sector 1 906 on DL_F1 and from Sector 2 908 on DL_F2. Accordingly, range-extension for serving the UE 902 can be achieved in a non-universal deployment scenario (i.e., a scenario where not all Sectors support both DL_F1 and DL_F2).

As will be appreciated, FIGS. 10A-10C are directed to UE 902s that are configured for operation with receiving two distinct transport blocks on downlink carriers of different sectors (DL_F1 on Sector 1 906 and DL_F1 on Sector 2 908 as in FIG. 10A, or DL_F1 on Sector 1 906 and DL_F2 on Sector 2 908 as in FIGS. 10B and 10C). Such UEs 902 may be characterized as DC-HSDPA compatible-UEs and/or SF-DC-HSDPA compatible UEs. Below, UEs 902 are described with respect to FIGS. 10D-10G as being capable of tuning to three (3) or more transport blocks on a plurality of downlink carriers concurrently. UEs 902 that are capable of tuning to three or more transport blocks on a plurality of downlink carriers concurrently may be characterized as 4C-HSDPA compatible UEs in Release 10.

Figure 10D:
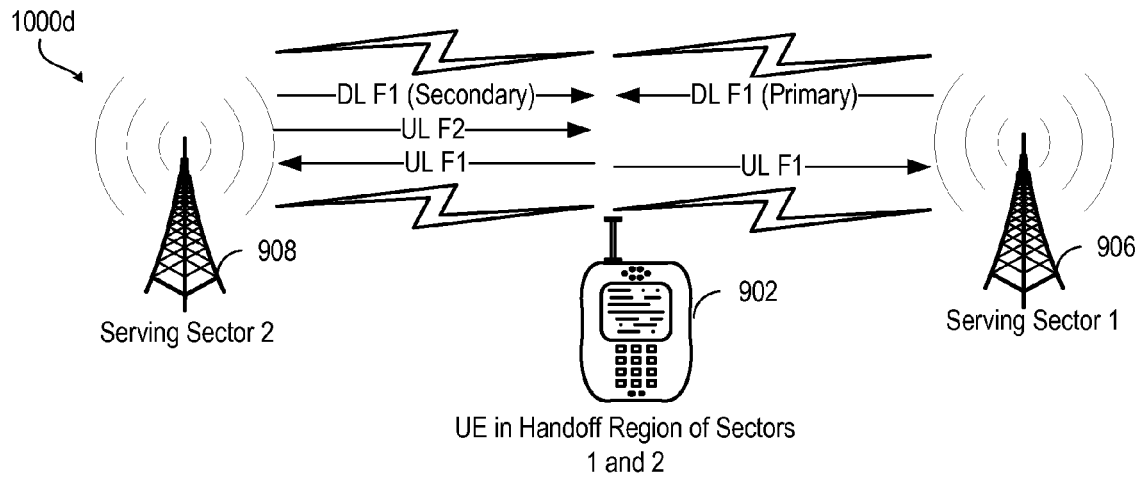

In FIG. 10D, a communication system 1000d is illustrated in accordance with an implementation example of the method of FIG. 9A, whereby serving Sector 1 906 communicates with the UE 902 via the a single downlink carrier (i.e., DL_F1), serving Sector 2 908 communicates with the UE 902 via multiple downlink carriers (i.e., DL_F1 and DL_F2) and the UE 902 is assigned a single uplink carrier (i.e., UL_F1 or anchor carrier) on which to provide feedback for the respective carrier groups (i.e., a first carrier group including at least DL_F1 and DL_F2 of Sector 2 908, and a second carrier group including at least DL_F1 of Sector 1 906). Thus, in the example of FIG. 10D, Sectors 1 and 2 906, 908 support the UE 902 via both overlapping (i.e., DL_F1) and non-overlapping (i.e., DL_F2) carriers. In the illustrative version of FIG. 10D, the serving Sector 1 906 is the primary sector for supporting DL_F1, and the serving Sector 2 908 is the secondary sector for supporting DL_F1. Further, because Sector 2 908 is the only sector supporting DL_F2 in FIG. 10D, Sector 2 908 is 'primary' for DL_F2 in the sense that there are no secondary sectors supporting DL_F2. Referring to FIG. 10D, assume that the downlink carrier DL_F1 in Sector 1 906 and the downlink carriers DL_F1 and DL_F2 in Sector 2 908 each carry a distinct HS-DSCH that can be monitored by the UE 902. In this case, three (3) distinct transport blocks can be conveyed from Sectors 1 and 2 906, 908 to the UE 902 via the three HS-DSCHs on the different carriers or frequencies (i.e., DL_F1 in Sector 1 906 and DL_F1 and DL_F2 in Sector 2 908). As shown in FIG. 10D, because each of the primary serving Sector 1 906 and the secondary serving Sector 2 908 support F1, and because Sectors 1 and 2 906, 908 are each in the active set for the anchor carrier UL_F1, each of Sectors 1 and 2 906, 908 can monitor and receive signals from the UE 902 that are transmitted on the uplink carrier UL_F1 as the anchor carrier.

Figure 10E:
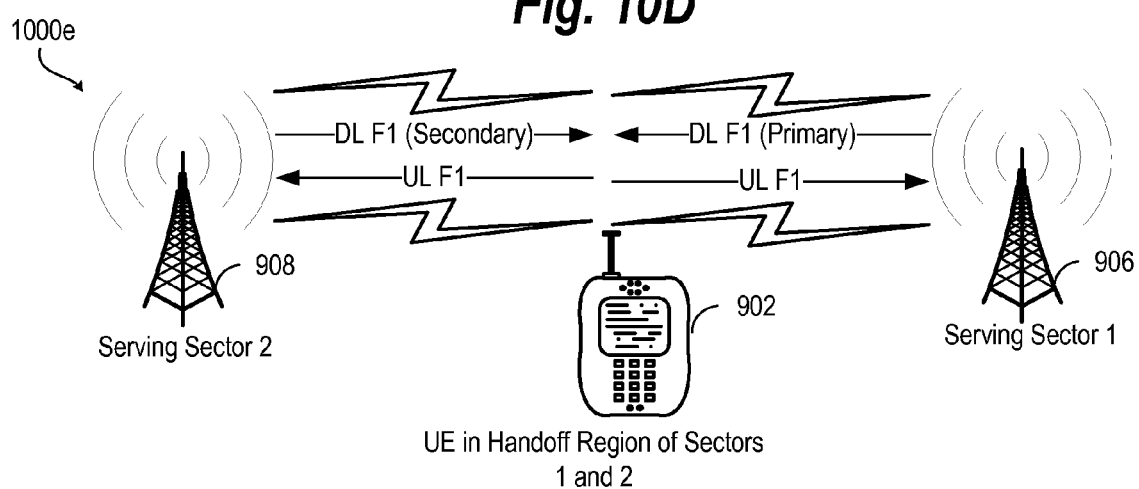

In FIG. 10E, a communication system 1000e is illustrated in accordance with an implementation example of the method of FIG. 9B, whereby serving Sector 1 906 communicates with the UE 902 via the a single downlink carrier (i.e., DL_F1), serving Sector 2 908 communicates with the UE 902 via multiple downlink carriers (i.e., DL_F1 and DL_F2) and the UE 902 is assigned two uplink carriers (i.e., UL_F1 and UL_F2) on which to provide feedback for the carrier group. The example of FIG. 10E is similar to the example described above with respect to FIG. 10D, except that FIG. 10E provisions the UE 902 with two uplink carriers (UL_F1 and UL_F2) instead of the single uplink carrier (UL_F1) from FIG. 10D, resulting in two distinct carrier groups and active sets for the UE 902. Accordingly, the two uplink carriers (UL_F1 and UL_F2) permit the UE 902 to control two distinct carrier groups either separately or via a given anchor carrier selected from UL_F1 and UL_F2, as described above with respect to FIG. 9B. For example, the uplink carrier UL_F1 can provide feedback in association with a first carrier group including at least the downlink carrier DL_F1 on Sector 1 906, and the uplink carrier UL_F2 can provide feedback in association with a second carrier group including at least the downlink carriers DL_F1 and DL_F2 on Sector 2 908. Alternatively, even though two separate uplink carriers are assigned to the UE, feedback for both carrier groups can be provided via a single anchor carrier (UL_F1 or UL_F2), as discussed above. A further description of FIG. 10E will be omitted for the sake of brevity, due to its similarity to FIG. 10D.

Figure 10F:
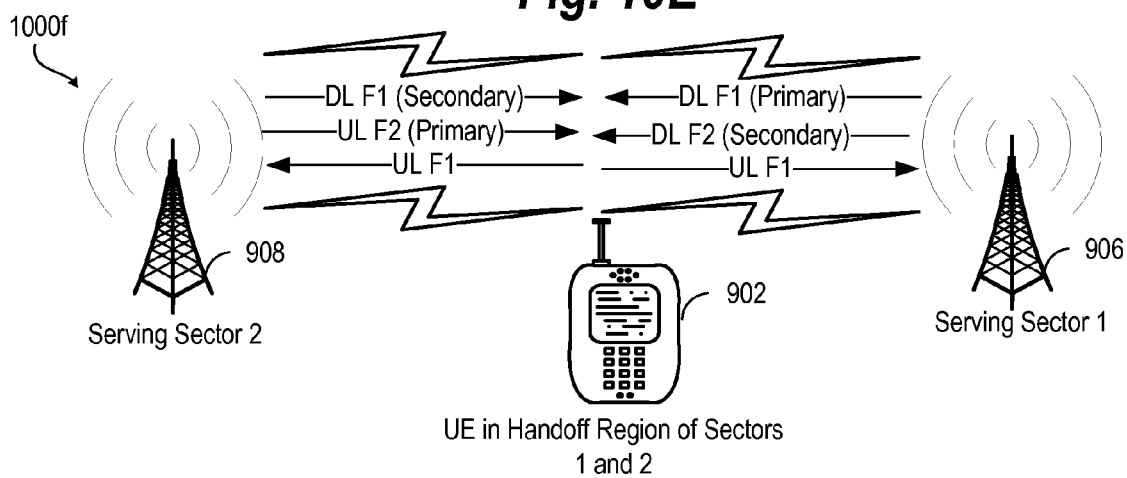

In FIG. 10F, a communication system 1000f is illustrated in accordance with an implementation example of the method of FIG. 9A, whereby serving Sector 1 906 communicates with the UE 902 via multiple downlink carriers (i.e., DL_F1 and DL_F2), serving Sector 2 908 also communicates with the UE 902 via the same multiple downlink carriers (i.e., DL_F1 and DL_F2) and the UE 902 is assigned a single uplink carrier (i.e., UL_F1) on which to provide feedback for the carrier group. Thus, in the example of FIG. 10F, Sectors 1 and 2 906, 908 support the UE 902 via the same overlapping carriers (i.e., DL_F1 and DL_F2). In the illustrative version of FIG. 10F, serving Sector 1 906 is the primary sector for DL_F1 and the secondary sector for DL_F2, and serving Sector 2 908 is the primary sector for DL_F2 and the secondary sector for DL_F1. Referring to FIG. 10F, assume that the downlink carriers DL_F1 and DL_F2 in Sector 1 906 and the downlink carriers DL_F1 and DL_F2 in Sector 2 908 each carry a distinct HS-DSCH that can be monitored by the UE 902. In this case, four (4) distinct transport blocks can be conveyed from Sectors 1 and 2 906, 908 to the UE 902 via the four HS-DSCHs on the different carriers or frequencies (i.e., DL_F1 and DL_F2 in Sector 1 906 and also DL_F1 and DL_F2 in Sector 2 908). As shown in FIG. 10F, because each of Sectors 1 and 2 906, 908 support F1, and because Sectors 1 and 2 906, 908 are each in the active set for the anchor carrier UL_F1, each of Sectors 1 and 2 906, 908 can monitor and receive signals from the UE 902 that are transmitted on the uplink anchor carrier (which can be UL_F1 or UL_F2).

Figure 10G:
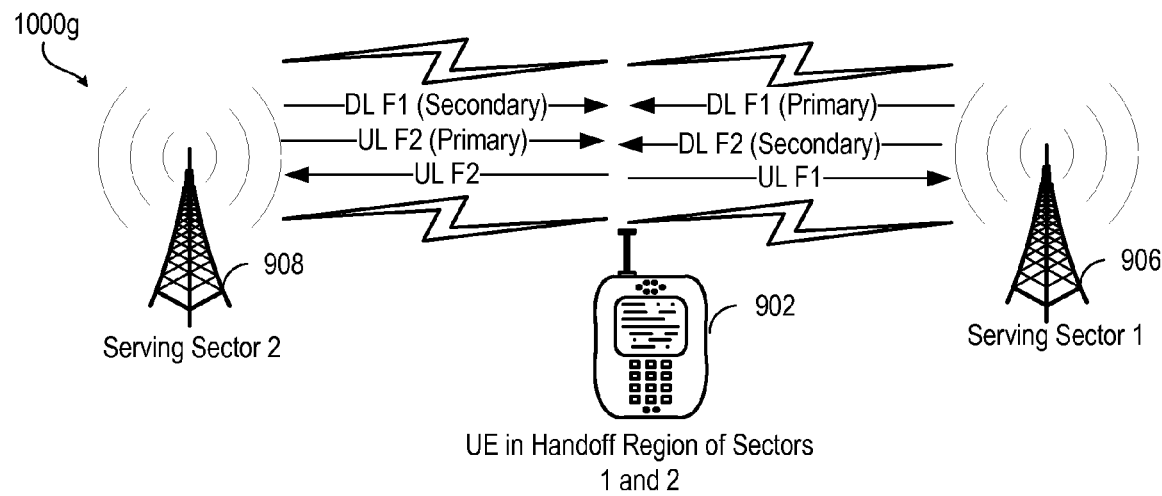

In FIG. 10G, a communication system 1000g is illustrated in accordance with an implementation example of the method of FIG. 9B, whereby serving Sector 1 906 communicates with the UE 902 via multiple downlink carriers (i.e., DL_F1 and DL_F2), serving Sector 2 908 also communicates with the UE 902 via multiple downlink carriers (i.e., $F_1$ and DL_F2) and the UE 902 is assigned two uplink carriers (i.e., UL_F1 and UL_F2) on which to provide feedback for the carrier group. The example of FIG. 10G is similar to the example described above with respect to FIG. 10F, except that FIG. 10G provisions the UE 902 with two uplink carriers (UL_F1 and UL_F2) instead of the single uplink carrier (UL_F1) from FIG. 10F, resulting in two distinct carrier groups and active sets for the UE 902. Accordingly, the two uplink carriers (UL_F1 and UL_F2) permit the UE 902 to control two distinct carrier groups either separately, as described above with respect to FIG. 9B. For example, the uplink carrier UL_F1 can provide feedback in association with a first carrier group including at least the downlink carriers DL_F1 and DL_F2 on Sector 1 906, and the uplink carrier UL_F2 can provide feedback in association with a second carrier group including at least the downlink carriers DL_F1 and DL_F2 on Sector 2 908. Alternatively, feedback for both carrier groups can be provided via a single anchor carrier (UL_F1 or UL_F2), as discussed above. A further description of FIG. 10G will be omitted for the sake of brevity, due to its similarity to FIG. 10F.

While above-described aspects of the present innovation are directed to two distinct carriers that can be supported by two sectors, it will be appreciated that other aspects of the innovation can be directed to (i) more than two carrier frequencies (F3, F4, etc.) and/or (ii) more than two sectors supporting the UE 902 concurrently. For example, if the UE 902 enters a handover region where service can be provided from three different sectors, the UE 902 could potentially tune to carrier group(s) associated with downlink carriers in each of the three sectors. Further, the downlink carriers (DL_F1, DL_F2, etc.) allocated to the UE 902 may be adjacent carriers, non-adjacent carriers in the same frequency band, such as in FIG. 10A, whereby DL_F1 is support from Sectors 1 and 2 906, 908, etc.) and/or non-adjacent carriers in different frequency bands.

For example, assume that there are two (2) downlink carriers DL_F1 and DL_F2, each of which is supported by two serving Sectors 1 and 2 906, 908. In this case, Sector 1 906 could be a 'primary' serving cell for DL_F1 and a secondary serving cell for DL_F2, and Sector 2 908 could be a primary serving cell for DL_F2 and a secondary serving cell for DL_F1. In another example, assume that there are two (2) downlink carriers DL_F1 and DL_F2 distributed among Sectors 1 through 4. In this case, Sector 1 906 can be a primary serving cell for DL_F1, Sector 2 908 can be a secondary serving cell for DL_F1, Sector 3 can be a primary serving cell for DL_F2 and Sector 4 can be a secondary serving cell for DL_F2.

Further, while not discussed explicitly in the description of the illustrative versions above, it will be appreciated that the HS-DPCCH power offset may need to be boosted so as to be decodable at multiple cells. Similarly, the uplink pilot SINR set point may also need to be boosted. The amount of boosting can be relatively modest if the carrier group is chosen properly.

Figure 11A:
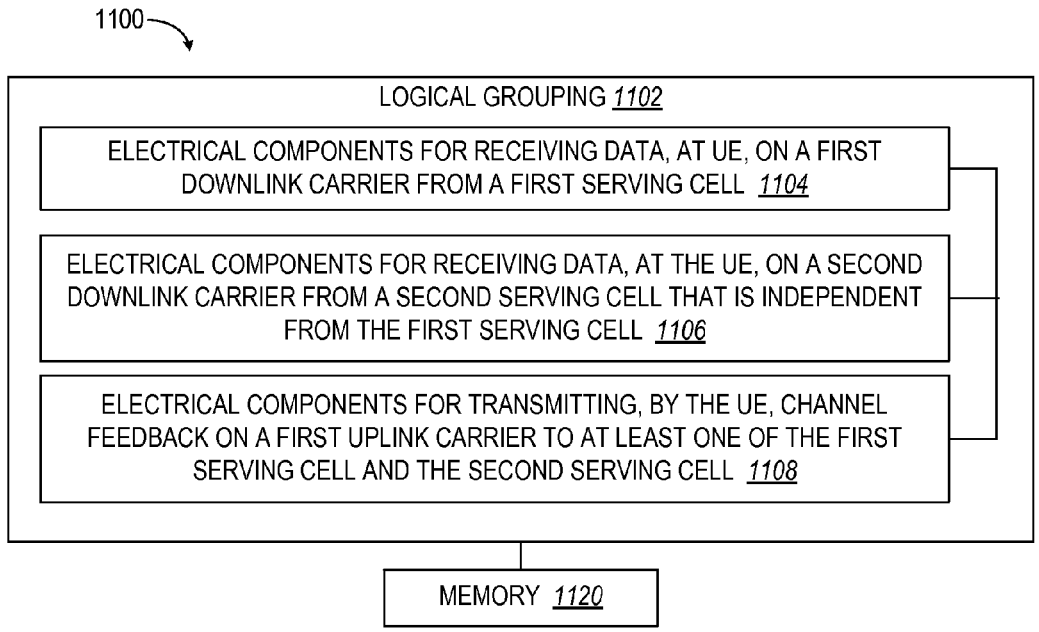
FIG. 11A is a block diagram of one aspect of a system of logical groups of electrical components for communication using dual uplink transmit time interval performed by user apparatus.

Further, several enhancements can be implemented on upper-layers to improve performance. For example, the UE 902 can establish multiple MAC-ehs entities, one for each HS serving cell. The multiple MAC-ehs can be co-located, or non-co-located, and on one or multiple frequencies. In this case, it will be appreciated that out-of-order delivery between MAC-ehs flows can occur. The out-of-order delivery issue between the MAC-ehs flows can be reduced via RLC layer modifications and/or via a PDCP-based approach With reference to FIG. 11A, illustrated is a system 1100 for wireless communication, and more particularly for receiving data in HSDPA from two independent cells or sectors. For example, system 1100 can reside at least partially within user equipment that is capable of Over-The-Air (OTA) communication, such as user equipment 114 (FIG. 1). It is to be appreciated that system 1100 is represented as including functional blocks, which can be functional blocks that represent functions implemented by a computing platform, processor, software, or combination thereof (e.g., firmware). System 1100 includes a logical grouping 1102 of electrical components that can act in conjunction. For instance, logical grouping 1102 can include an electrical component 1104 for receiving data, at user equipment, on a first downlink carrier from a first serving cell. Moreover, logical grouping 1102 can include an electrical component 1106 for receiving data, at the user equipment, on a second downlink carrier from a second serving cell that is independent from the first serving cell. Further in an exemplary aspect, logical grouping 1102 can include an electrical component 1108 for transmitting, by the user equipment, channel feedback on a first uplink carrier to at least one of the first serving cell and the second serving cell. Additionally, system 1100 can include a memory 1120 that retains instructions for executing functions associated with electrical components 1104-1108. While shown as being external to memory 1120, it is to be understood that one or more of electrical components 1104-1108 can exist within memory 1120.

Figure 11B:
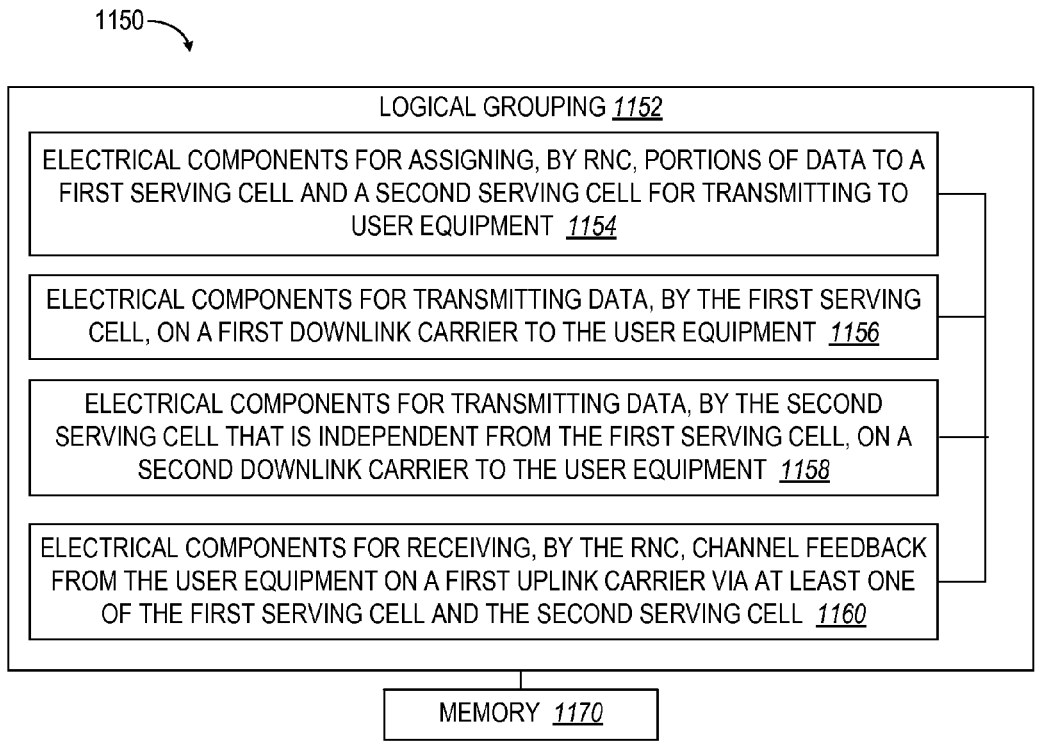
FIG. 11B is a lock diagram of one aspect of a system of logical groups of electrical components for communication using dual uplink transmit time interval performed by network apparatus.

With reference to FIG. 11B, illustrated is a system 1150 for wireless communication, and more particularly for HSDPA from two independent cells or sectors. For example, system 1150 can reside at least partially within a network apparatus for radio access, such as the RAN 102 (FIG. 1). It is to be appreciated that system 1150 is represented as including functional blocks, which can be functional blocks that represent functions implemented by a computing platform, processor, software, or combination thereof (e.g., firmware). System 1150 includes a logical grouping 1152 of electrical components that can act in conjunction. For instance, logical grouping 1152 can include an electrical component 1154 for assigning, by an RNC, portions of data to a first serving cell and a second serving cell for transmitting to user equipment. Moreover, logical grouping 1152 can include an electrical component 1156 for transmitting data, by the first serving cell, on a first downlink carrier to the user equipment. Further, logical grouping 1152 can include an electrical component 1158 for transmitting data, by the second serving cell that is independent from the first serving cell, on a second downlink carrier to the user equipment. In an exemplary addition, logical grouping 1152 can include an electrical component 1160 for receiving, by the RNC, channel feedback from the user equipment on a first uplink carrier via at least one of the first serving cell and the second serving cell. Additionally, system 1150 can include a memory 1170 that retains instructions for executing functions associated with electrical components 1154-1160. While shown as being external to memory 1170, it is to be understood that one or more of electrical components 1154-1160 can exist within memory 1170.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus of receiving data in High Speed Downlink Packet Access (HSDPA) from two independent cells or sectors, the apparatus comprising:
    a first receiver, at a user equipment, for receiving data on a first downlink carrier from a first serving cell, wherein the first downlink carrier is from a first set of carriers;
    a second receiver, at the user equipment, for receiving data on a second downlink carrier from a second serving cell that is independent from the first serving cell, wherein the second downlink carrier is from a second set of carriers and the first receiver receives the first data concurrent with the second receiver receiving the second data; and
    a first transmitter, at the user equipment, for transmitting channel feedback on a single uplink carrier to the first serving cell and the second serving cell, wherein the single uplink carrier is included among the first set of carriers and the second set of carriers.

2. The apparatus of claim 1, wherein the first serving cell and the second serving cell are selected by a Radio Network Controller (RNC) from an active set based upon a measurement report by the user equipment.

3. The apparatus of claim 1, wherein the first receiver is further for monitoring a first High Speed Shared Control Channel (HS-SCCH) transmitted by the first serving cell for the first downlink carrier, wherein the second receiver is further for monitoring a second HS-SCCH transmitted by the second serving cell for the second downlink carrier, and the apparatus further comprising an encoder for encoding, in one code word on the first uplink carrier, channel feedback comprising High Speed Downlink Physical Control Channel (HS-DPCCH) information based at least in part upon the first HS-SCCH and the second HS-SCCH.

4. The apparatus of claim 3, further comprising a second transmitter, at the user equipment, for transmitting data on a second uplink carrier to at least one of the first serving cell and the second serving cell, wherein the first uplink carrier comprises an anchor carrier.

5. The apparatus of claim 1, wherein the first serving cell comprises a first serving sector and the second serving cell comprises a second serving sector.

6. An apparatus of transmitting data in High Speed Downlink Packet Access (HSDPA) from two independent cells or sectors, the apparatus comprising:

means for assigning, by a Radio Network Controller (RNC), portions of data to a first serving cell and a second serving cell for transmitting to a user equipment;

means for transmitting first data, by the first serving cell, on a first downlink carrier to the user equipment, wherein the first downlink carrier is from a first set of carriers and a first receiver at the user equipment receives the first data;

means for transmitting second data, by the second serving cell that is independent from the first serving cell, on a second downlink carrier to the user equipment, wherein the second downlink carrier is from a second set of carriers, a second receiver at the user equipment receives the second data, and the first receiver receives the first data concurrent with the second receiver receiving the second data; and means for receiving channel feedback on a single uplink carrier at the first serving cell and the second serving cell, wherein the single uplink carrier is included among the first set of carriers and the second set of carriers.

7. The apparatus of claim 6, further comprising:

the RNC for assigning portions of data to the first serving cell and the second serving cell for transmitting to the user equipment;

the first serving cell for transmitting data on the first downlink carrier to the user equipment; and the second serving cell, which is independent from the first serving cell, for transmitting data on the second downlink carrier to the user equipment.

* * * * *